US011968127B2

(12) United States Patent
Liu et al.

(10) Patent No.: US 11,968,127 B2
(45) Date of Patent: Apr. 23, 2024

(54) PROTOCOL DATA UNIT (PDU) SESSION MANAGEMENT METHOD AND APPARATUS

(71) Applicant: DATANG MOBILE COMMUNICATIONS EQUIPMENT CO., LTD., Beijing (CN)

(72) Inventors: Xianfeng Liu, Beijing (CN); Hucheng Wang, Beijing (CN); Hui Xu, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 0 days.

(21) Appl. No.: 18/255,422

(22) PCT Filed: Nov. 18, 2021

(86) PCT No.: PCT/CN2021/131573
§ 371 (c)(1),
(2) Date: Jun. 1, 2023

(87) PCT Pub. No.: WO2022/116855
PCT Pub. Date: Jun. 9, 2022

(65) Prior Publication Data
US 2024/0031300 A1    Jan. 25, 2024

(30) Foreign Application Priority Data

Dec. 4, 2020  (CN) .......................... 202011407142.1
Dec. 23, 2020 (CN) .......................... 202011540381.4

(51) Int. Cl.
*H04L 47/2483* (2022.01)
*H04B 7/185* (2006.01)
*H04W 28/02* (2009.01)

(52) U.S. Cl.
CPC ..... *H04L 47/2483* (2013.01); *H04B 7/18589* (2013.01); *H04W 28/0215* (2013.01)

(58) Field of Classification Search
CPC ........... H04L 47/2483; H04L 47/2441; H04B 7/18589; H04B 7/18513; H04B 7/18541;
(Continued)

(56) References Cited

U.S. PATENT DOCUMENTS

2020/0351766 A1    11/2020 Young
2021/0092640 A1*   3/2021 Ravishankar ....... H04L 47/6275
(Continued)

FOREIGN PATENT DOCUMENTS

CN    111262616 A    6/2020
CN    111629400 A    9/2020
(Continued)

OTHER PUBLICATIONS

Written Opinion and International Search Report issued Feb. 7, 2022 in International Application No. PCT/CN2021/131573.
(Continued)

*Primary Examiner* — Karen C Tang
(74) *Attorney, Agent, or Firm* — Harness, Dickey & Pierce, P.L.C.

(57) ABSTRACT

Provided are a protocol data unit (PDU) session management method and apparatus. The method includes: receiving an SM policy modification request for a PDU session, and the request triggering establishment of a first QoS flow in the PDU session, in which the PDU session is established by a first terminal; in response to no data transmission tunnel having a same identifier as a flow identifier of the first QoS flow existing between a first UPF of a first satellite and a second UPF of a second satellite, establishing a first data transmission tunnel between the first UPF and the second UPF; and instructing the first UPF to transmit data of the first QoS flow through the first data transmission tunnel.

20 Claims, 9 Drawing Sheets

(58) Field of Classification Search
CPC . H04W 28/0215; H04W 36/12; H04W 76/11; H04W 28/0268; H04W 76/22; H04W 40/12; H04W 76/12; H04W 84/06; H04W 92/045
USPC .......................................................... 709/228
See application file for complete search history.

(56) References Cited

U.S. PATENT DOCUMENTS

| | | | |
|---|---|---|---|
| 2022/0264503 A1* | 8/2022 | Starsinic | H04W 8/20 |
| 2022/0303823 A1* | 9/2022 | Guo | H04W 76/20 |
| 2023/0247506 A1* | 8/2023 | Xu | H04W 36/0064 370/331 |
| 2024/0015567 A1* | 1/2024 | Mladin | H04W 28/0268 |

FOREIGN PATENT DOCUMENTS

| | | |
|---|---|---|
| CN | 111788847 A | 10/2020 |
| WO | WO-2014/179367 A1 | 11/2014 |
| WO | WO-2020/034316 A1 | 2/2020 |
| WO | WO-2020/173438 A1 | 9/2020 |

OTHER PUBLICATIONS

Notice of the First Review Opinion issued Jul. 7, 2023 in Chinese Application No. 202011540381.4.
Catt, "Discussion on QoS limitation awared UPF selection, "3GPP TSG-SA WG2 Meeting #141E, S2-2007079, Oct. 2, 2020.

\* cited by examiner

PROTOCOL DATA UNIT (PDU) SESSION MANAGEMENT METHOD AND APPARATUS

CROSS REFERENCE TO RELATED APPLICATIONS

This application is a U.S. national phase of International Application No. PCT/CN2021/131573, filed with the State Intellectual Property Office of P. R. China on Nov. 18, 2021, which claims priority to Chinese patent application Serial No. 202011407142.1 filed on Dec. 4, 2020, and Chinese patent application Serial No. 202011540381.4 filed on Dec. 23, 2020, and the entire contents of each of which are hereby incorporated by reference into this disclosure.

TECHNICAL FIELD

The disclosure relates to a field of mobile communication technology, and in particular to a Protocol Data Unit (PDU) session management method and a PDU session management apparatus.

BACKGROUND

The current 5G (5th Generation) mobile communication core network system including a User Plane Function (UPF) is deployed on the ground. When satellite terminals access the 5G core network through a satellite Access Network (AN) to achieve interconnection, a user service data flow needs to be sent from a satellite route to a terrestrial UPF for communication among the satellite terminals.

However, when sending the user service data flow from the satellite route to the terrestrial UPF for communication among the satellite terminals, the satellite needs to send the user service data to the terrestrial UPF, which results in a large transmission delay.

SUMMARY

According to a first aspect of the disclosure, a PDU session management method is provided. The method includes: receiving a Session Management (SM) policy modification request for a PDU session, in which the request triggers establishment of a first Quality of Service (QoS) flow in the PDU session, and the PDU session is established by a first terminal; in response to no data transmission tunnel having a same identifier as a flow identifier of the first QoS flow existing between a first UPF of a first satellite and a second UPF of a second satellite, establishing a data transmission tunnel between the first UPF and the second UPF, in which the first satellite is a satellite serving the first terminal, the second satellite is a satellite serving a second terminal, and the second terminal is determined based on application layer information; and instructing the first UPF to transmit data of the first QoS flow through the data transmission tunnel.

According to a second aspect of the disclosure, an apparatus including a memory, a transceiver, and a processor is provided. The memory is configured to store computer programs. The transceiver is configured to send and receive data under a control of the processor. The processor is configured to read the computer programs in the memory and perform the following operations:

receiving an SM policy modification request for a PDU session, in which the request triggers establishment of a first QoS flow in the PDU session, and the PDU session is established by a first terminal;

in response to no data transmission tunnel having a same identifier as a flow identifier of the first QoS flow existing between a first UPF of a first satellite and a second UPF of a second satellite, establishing a data transmission tunnel between the first UPF and the second UPF, in which the first satellite is a satellite serving the first terminal, the second satellite is a satellite serving a second terminal, and the second terminal is determined based on application layer information; and instructing the first UPF to transmit data of the first QoS flow through the data transmission tunnel.

According to a third aspect of the disclosure, a processor-readable storage medium having computer programs stored thereon is provided. The computer programs are configured to cause a processor to implement the above PDU session management method.

According to a fourth aspect of the disclosure, a computer program product including computer programs is provided. When the computer programs are executed by a processor, the above PDU session management method is implemented.

Additional aspects and advantages of the disclosure will be given in part in the following description, which will become apparent from the following description, or will be learned through the practice of the disclosure.

BRIEF DESCRIPTION OF THE DRAWINGS

The foregoing and/or additional aspects and advantages of the disclosure will become apparent and readily understood from the following description of embodiments in combination with the accompanying drawings, in which.

DETAILED DESCRIPTION

The term "and/or" in this embodiment of the disclosure describes the association relation of the associated objects and indicates three relations, for example, A and/or B indicates the following three cases: A alone, both A and B, and B alone. The character "/" generally indicates that the associated objects before and after is an "or" relation.

The term "plurality" in the embodiments of the disclosure refers to two or more, and other quantitative terms are similar.

The following is a clear and complete description of the technical solutions in the embodiments of the disclosure in combination with the accompanying drawings of the embodiments of the disclosure. Obviously, the described embodiments are only a part of the embodiments of the disclosure, and not all of them. Based on the embodiments in this disclosure, all other embodiments obtained by those skilled in the art without inventive works fall within the scope of protection of this disclosure.

The embodiments of the disclosure provide a PDU session management method and a PDU session management apparatus, to solve the problem of large transmission delay when sending the user service data flow from the satellite route to the terrestrial UPF for communication among the satellite terminals in the related art.

The method and the apparatus are based on the same application concept, and since the method and the apparatus solve the problem with similar principles, the implementation of the method and the apparatus can be cross-referenced, and the repetition will not be illustrated again.

According to the PDU session management method provided by the embodiments of the disclosure, in response to the SMF receiving the SM policy modification request for the PDU session established by the first terminal and no data transmission tunnel having the same identifier as the flow identifier of the first QoS flow existing between the first UPF of the first satellite and the second UPF of the second satellite, the data transmission tunnel between the first UPF and the second UPF is established. The first UPF is instructed to transmit data of the first QoS flow through the data transmission tunnel. As a result, the data transmission tunnel between the first satellite and the second satellite is established by setting UPF on the satellite, to realize data transmission between the first terminal and the second terminal through the data transmission tunnel, such that there is no need to send service data of a satellite terminal to the ground through a satellite route, thereby reducing a transmission delay.

A PDU session management method, a PDU session management apparatus, an electronic device, a storage medium, and computer programs provided in this disclosure are described in detail below with reference to the accompanying drawings.

Figure 1:
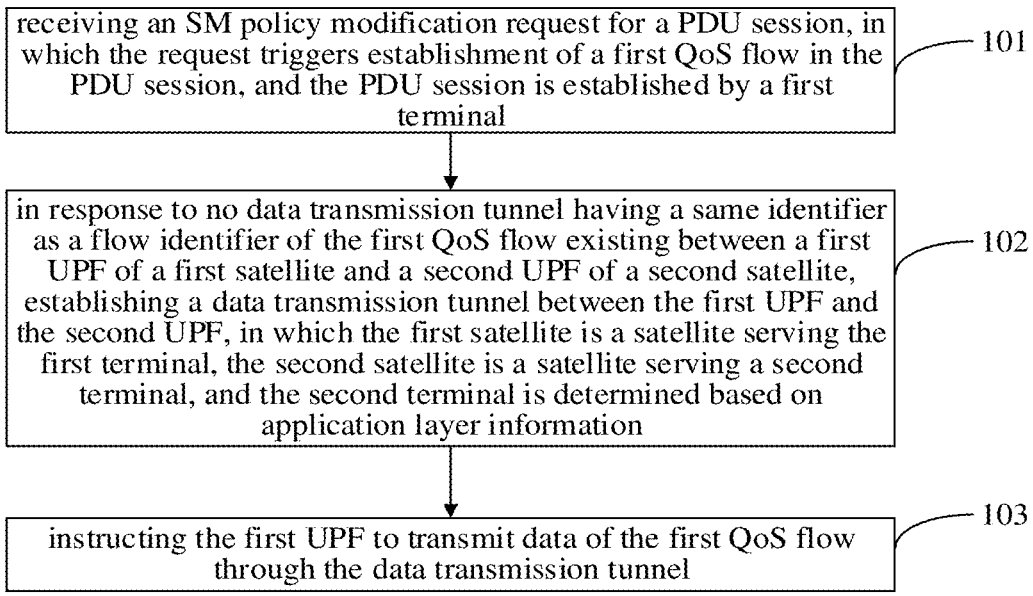
FIG. 1 is a flowchart of a PDU session management method according to an embodiment of the disclosure.

FIG. 1 is a flowchart of a PDU session management method according to an embodiment of the disclosure.

As shown in FIG. 1, the PDU session management method includes the following steps.

At step 101, an SM policy modification request for a PDU session is received. The request triggers establishment of a first QoS flow in the PDU session, in which the PDU session is established by a first terminal.

It is noted that the current 5G core network system including the UPF is deployed on the ground. When satellite terminals access the 5G core network through a satellite AN to achieve interconnection, a user service data flow needs to be sent from a satellite route to a terrestrial UPF for communication among the satellite terminals. However, the satellite needs to send the user service data to the terrestrial UPF, which results in a large transmission delay. Therefore, in the embodiments of the disclosure, the data transmission tunnel between the satellites can be established through a satellite UPF, so that direct communication between the satellites can be realized without using the terrestrial UPF, thereby reducing the transmission delay. The following is the detailed description of an example of applying the PDU session management method of the embodiment of the disclosure to an IP Multimedia Subsystem (IMS) service.

As a possible implementation, the establishment of the data transmission tunnel between the first satellite and the second satellite can be achieved through the SMF or other network elements in the 5G core network, which is not limited in the embodiments of the disclosure. In the embodiment of the disclosure, the SMF is used as an example for specific illustration. The SMF is a functional element of 5G service-based architecture and mainly responsible for interacting with separated data planes, establishing, updating and deleting the PDU session, and managing a session environment with UPF.

In the embodiment of the disclosure, the first terminal can initiate the IMS session establishment procedure when needed, i.e., sending a Session Initialization Protocol (SIP) Invite message to a Proxy Call Session Control Function (P-CSCF), in which this SIP Invite message is sent to the second terminal through the IMS network and the terrestrial UPF. After receiving the SIP 183 Progress message from the second terminal, the P-CSCF sends an AA-Request message (AAR) to the Policy Control function (PCF), and then the PCF initiates an SM policy modification procedure to the SMF, and sends an IMS voice-related QoS policy to the SMF.

After the SM policy modification procedure initiated by the PCF is obtained, the SMF determines that the SM policy modification request for the PDU session is received, and establishes the first QoS flow in the PDU session.

At step 102, in response to no data transmission tunnel having a same identifier as a flow identifier of the first QoS flow existing between a first UPF of a first satellite and a second UPF of a second satellite, a data transmission tunnel between the first UPF and the second UPF is established, in which the first satellite is a satellite serving the first terminal, the second satellite is a satellite serving a second terminal, and the second terminal is determined based on application layer information.

The second terminal is a terminal currently used for transmitting data with the first satellite. For example, if the first terminal is a calling satellite terminal, the second terminal is a called satellite terminal.

The flow identifier may be a 5QI parameter of a QoS flow, in which 5QI is a scalar quantity for pointing to a 5G QoS characteristic.

In the embodiment of the disclosure, in the SM policy modification procedure initiated by the PCF to the SMF, the IMS voice-related QoS policy is sent to the SMF, to trigger the SMF to establish the first QoS flow with 5QI=1 on the first terminal side, i.e., to determine the flow identifier of the first QoS flow as 1.

In the embodiment of the disclosure, the SMF may determine from DNN or application layer information that the data of the first QoS flow needs to be transmitted between the first satellite serving the first terminal and the second satellite serving the second terminal. For example, in the IMS service, it may be determined that the data of the first QoS flow needs to be transmitted between the first satellite and the second satellite when the data of the first QoS flow is voice data. When no data transmission tunnel with the same identifier as the flow identifier of the first QoS flow exists between the first UPF and the second UPF, the data transmission tunnel between the first satellite and the second satellite is established.

As a possible implementation, before the first terminal establishes the data transmission tunnel, the second terminal that carries out data transmission with the first terminal may have triggered the process of establishing the data transmission tunnel, so that before establishing the data transmission tunnel based on the SM policy modification request for the PDU session of the first terminal, it may also be determined whether the data transmission tunnel between the first UPF and the second UPF has been established. That is, in a possible implementation of the embodiment of the disclosure, after the above step 101, the method further includes:

in response to a data transmission tunnel having the same identifier as the flow identifier of the first QoS flow existing between the first UPF and the second UPF, transmitting the data of the first QoS flow through the existing data transmission tunnel.

The existing data transmission tunnel for transmission is established after receiving a PDU session establishment request and determining that a second identifier of the second terminal corresponding to a first identifier of the first terminal exists. The second terminal is a terminal to which the second identifier belongs.

In the embodiment of the disclosure, since the flow identifier of the QoS flow to be transmitted is required to be associated with the data transmission tunnel after the data transmission tunnel between the first UPF and the second UPF is established, if the SMF determines that there is a data transmission tunnel with the same identifier as the flow identifier of the first QoS flow established in the PDU session of the first terminal already existing between the first UPF and the second UPF, it may be determined that the second terminal has initiated the process of establishing the data transmission tunnel for transmitting the data of the first QoS flow before the first terminal, so that the already established data transmission tunnel between the first UPF and the second UPF can be directly used to transmit the data on the first QoS flow without re-establishing the data transmission tunnel between the first UPF and the second UPF, and the subsequent steps need not to be performed.

In the embodiment of the disclosure, a relation between the calling user and the called user can be fixed or not, so that the PDU session management method in the embodiment of the disclosure can support the establishment of a data transmission tunnel between the first terminal and the second terminal having a fixed relation, and also support the establishment of a data transmission tunnel between the first terminal and the second terminal having no fixed relation.

For example, in a first way in a case that the first terminal and the second terminal have a fixed relation, i.e., there is a second terminal corresponding to the first terminal, a data transmission tunnel between the first terminal and the second terminal can be established directly.

In the second way, in a case that the first terminal and the second terminal have a fixed relation, i.e., there is a second terminal corresponding to the first terminal, and that during the initial establishment of the PDU session, no data transmission tunnel between the first terminal and the second terminal is established (i.e., no data transmission tunnel between the first terminal and the second terminal exists), the embodiment of the disclosure may also support triggering the establishment of a data transmission tunnel between the first terminal and the second terminal based on the SM policy modification request for the PDU session after the PDU session is established.

In the third way, in a case that the first terminal and the second terminal have no fixed relation, the establishment of a data transmission tunnel between the first terminal and the second terminal can be triggered based on the SM policy modification request for the PDU session after the PDU session is established.

This disclosure does not limit the above three ways to establish the data transmission tunnel, in practice, the way to establish the data transmission tunnel can be flexibly adjusted according to the actual PDU session control requirements.

As a possible implementation, a correspondence between the first terminal and the second terminal can be pre-configured in the SMF. Therefore, when the first terminal initiates the PDU session, the unique identifier of the second terminal (e.g., Generic Public Subscription Identifier (GPSI)) is carried in the PDU session request so that the SMF can determine, based on the unique identifier of the second terminal and the locally-configured correspondence between the first terminal and the second terminal, whether there is the second terminal corresponding to the first terminal. In detail, in response to the locally-configured correspondence between the first terminal and the second terminal including the correspondence between the unique identifier of the first terminal and the unique identifier of the second terminal, it can be determined that there is the second terminal corresponding to the first terminal, otherwise, it can be determined that there is no second terminal corresponding to the first terminal.

Further, in response to the existence of a business requirement of establishing a data transmission tunnel between the first terminal and the second terminal at the time of establishing the PDU session, and the existence of a second terminal corresponding to the first terminal, the data transmission tunnel between the first terminal and the second terminal may be established directly at the time of establishing the PDU session in accordance with the first way described above. That is, in a possible implementation of the embodiment of the disclosure, before the above-mentioned step 101, the method further includes:

if the first terminal and the second terminal have a fixed relation, establishing the data transmission tunnel between the first terminal and the second terminal directly. That is, in a possible implementation of the embodiment of the disclosure, before the above-mentioned step 101, the method further includes:

receiving a PDU session establishment request, in which the PDU session is established by the first terminal.

Correspondingly, step 102 may include:

in response to existence of the second identifier of the second terminal corresponding to the first identifier of the first terminal, establishing the data transmission tunnel between the first UPF and the second UPF.

At step 103, the first UPF is instructed to transmit data of the first QoS flow through the data transmission tunnel.

In the embodiment of the disclosure, the SMF may establish the data transmission tunnel between the first satellite and the second satellite when it determines that the data of the first QoS flow needs to be transmitted directly between the first satellite and the second satellite. The SMF may obtain the UP context of the second terminal based on the unique second identifier of the second terminal (e.g., the Subscriber Permanent Identifier (SUPI)/GPSI), and determine tunnel information corresponding to the UP context of the second terminal as tunnel information of the second UPF based on a mapping relation between the UP context and the tunnel information. The tunnel information may include tunnel endpoint information of a local endpoint and tunnel endpoint information of an opposite endpoint. As a result, the data transmission tunnel between the first UPF located at the first satellite and the second UPF located at the second satellite can be established based on the tunnel information of the second UPF.

In detail, after the SMF determines the tunnel information of the second UPF, it can update the opposite endpoint information contained in the tunnel information of the first UPF based on the tunnel endpoint information of the second UPF to achieve direct communication between the first UPF and the second UPF, thereby completing the establishment of the data transmission tunnel between the first UPF of the first satellite and the second UPF of the second satellite. After the data transmission tunnel is established, the data transmission tunnel can be used to realize the transmission of the first QoS flow between the first terminal and the second terminal.

According to the PDU session management method provided by the embodiment of the disclosure, the SMF receives the SM policy modification request for the PDU session established by the first terminal, establishes the data transmission tunnel between the first UPF and the second UPF when there is no data transmission tunnel having the same identifier as the flow identifier of the first QoS flow in the PDU session between the first UPF of the first satellite and the second UPF of the second satellite, and instructs the first UPF to transmit the data of the QoS flow through the data transmission tunnel. As a result, the data transmission tunnel between the first satellite and the second satellite is established by setting UPF on the satellite, to realize data transmission between the first terminal and the second terminal through the data transmission tunnel, so that there is no need to send service data of a satellite terminal to the ground through a satellite route, thereby reducing a transmission delay.

In a possible implementation of the disclosure, a diversion process can be performed on the QoS data flow, to transmit specific service data through the data transmission tunnel between the first satellite and the second satellite, thereby reducing a transmission delay for the specific service.

The PDU session management method provided by the embodiment of the disclosure is further described below in combination with FIG. 2.

Figure 2:
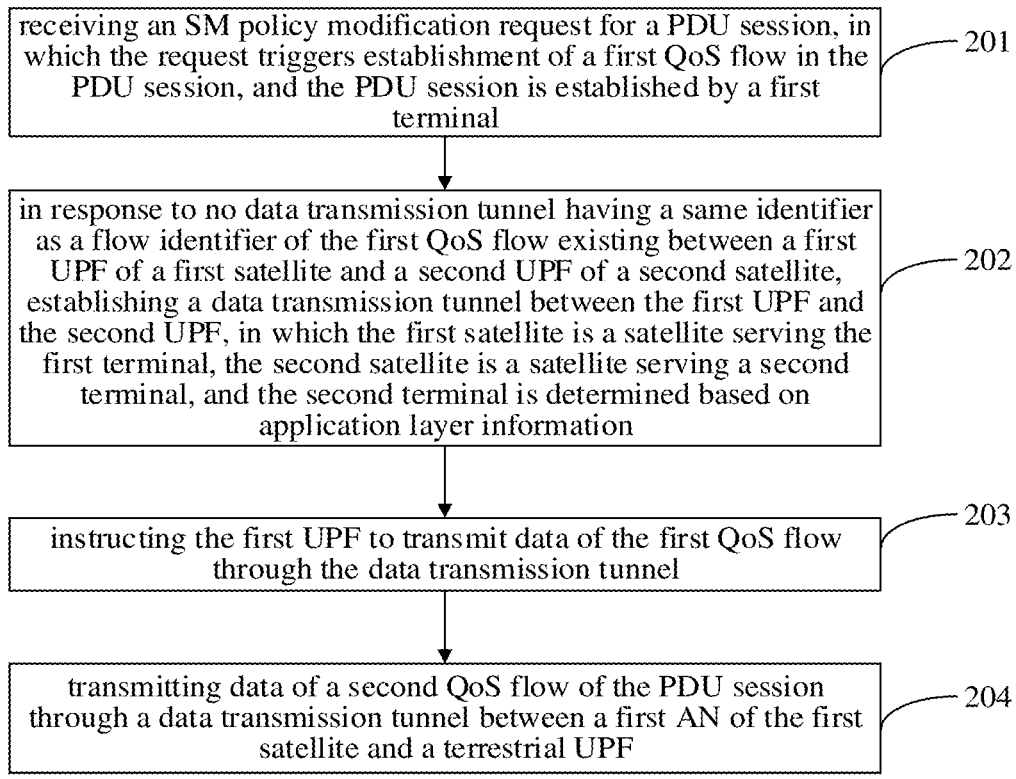
FIG. 2 is a flowchart of a PDU session management method according to another embodiment of the disclosure.

FIG. 2 is a flowchart of a PDU session management method according to another embodiment of the disclosure.

As shown in FIG. 2, the PDU session management method includes the following steps.

At step 201, an SM policy modification request for a PDU session is received, in which the request triggers establishment of a first QoS flow in the PDU session, and the PDU session is established by a first terminal.

At step 202, in response to no data transmission tunnel having a same identifier as a flow identifier of the first QoS flow existing between a first UPF of a first satellite and a second UPF of a second satellite, a data transmission tunnel between the first UPF and the second UPF is established, in which the first satellite is a satellite serving the first terminal, the second satellite is a satellite serving a second terminal, and the second terminal is determined based on application layer information.

At step 203, the first UPF is instructed to transmit data of the first QoS flow through the data transmission tunnel.

In the embodiment of the disclosure, steps 201-203 may be implemented in any implementation of the embodiments of the disclosure respectively, which is not limited in the embodiments of the disclosure and will not be elaborated.

At step 204, data of a second QoS flow of the PDU session is transmitted through a data transmission tunnel between a first AN of the first satellite and a terrestrial UPF.

The second QoS flow is a QoS flow that carries data other than specific service data. For example, in the IMS service, in response to the specific service data being IMS voice data, the second QoS flow may be a QoS flow used to carry IMS signaling data.

In the embodiment of the disclosure, in order to improve a data transmission rate and reduce a transmission delay for the specific service data, only the QoS flow for carrying the specific service data can be transmitted through the data transmission tunnel between the first UPF and the second UPF. Therefore, upon obtaining the SM policy modification procedure initiated by the PCF, the SMF determines that a request for transmitting a new first QoS flow is received and can trigger the process of establishing the data transmission tunnel between the first UPF and the second UPF. During the process of establishing the data transmission tunnel, the diversion process is performed on the QoS flow according to the actual service requirements, to determine the first QoS flow to be transmitted on the data transmission tunnel between the first UPF and the second UPF, and the second QoS flow to be transmitted on the data transmission tunnel between the first AN of the first satellite and the terrestrial UPF.

For example, in the IMS service, in response to the need to transmit the IMS voice data on the data transmission tunnel between the first satellite and the second satellite according to the actual service requirements, the IMS signaling data is transmitted on the data transmission tunnel between the first AN of the first satellite and the terrestrial UPF, the first QoS flow carrying the IMS voice data can be transmitted on the data transmission tunnel between the first UPF and the second UPF, and the QoS flow carrying the IMS signaling data can be determined as the second QoS flow and transmitted through the data transmission tunnel between the first AN of the first satellite and the terrestrial UPF.

According to the PDU session management method provided by the embodiment of the disclosure, the SMF receives the SM policy modification request for the PDU session established by the first terminal, establishes the data transmission tunnel between the first UPF and the second UPF when there is no data transmission tunnel having the same identifier as the flow identifier of the first QoS flow in the PDU session between the first UPF of the first satellite and the second UPF of the second satellite, and instructs the first UPF to transmit the data of the QoS flow through the data transmission tunnel and transmit the second QoS flow to the second satellite through the data transmission tunnel between the first AN of the first satellite and the terrestrial UPF. As a result, the data transmission tunnel between the first satellite and the second satellite is established by setting UPF on the satellite, and the diversion process is performed on the QoS flow according to the actual service requirements, to realize transmission of specific service data between the first terminal and the second terminal through the data transmission tunnel, so that there is no need to send service data of a satellite terminal to the ground through a satellite route, thereby reducing a transmission delay of the specific service data and ensuring a reliability of other data transmission.

In a possible implementation of the disclosure, after the data transmission tunnel between the first satellite and the second satellite is established, the AN accessed by the first terminal may be handed over from the first AN to another AN, which requires the data transmission tunnel to be re-established after the handover of the AN, to improve the stability of the data transmission tunnel.

The PDU session management method provided by the embodiment of the disclosure is further described below in combination with FIG. 3.

Figure 3:
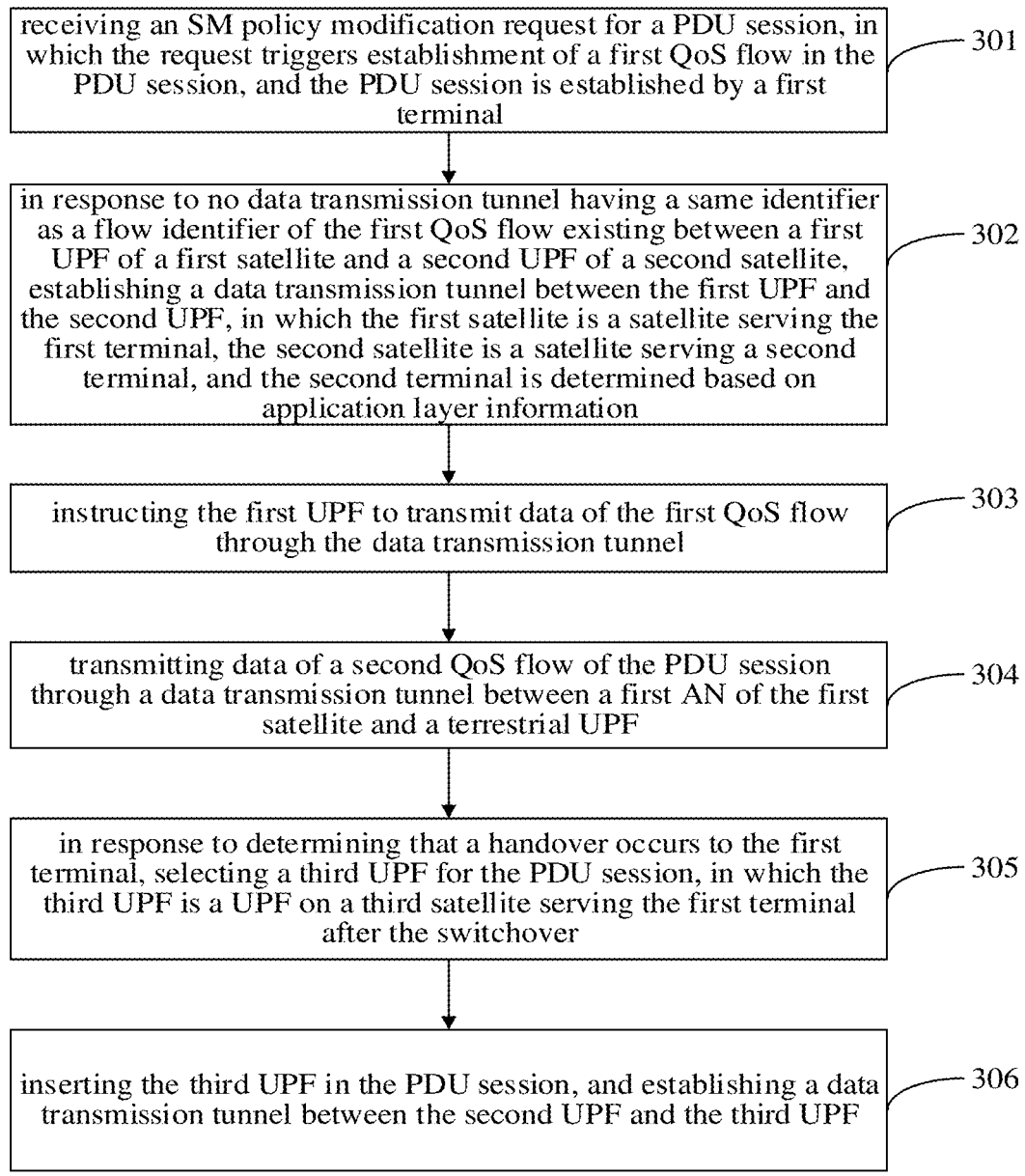
FIG. 3 is a flowchart of a PDU session management method according to a further embodiment of the disclosure.

FIG. 3 is a flowchart of a PDU session management method according to a further embodiment of the disclosure.

As shown in FIG. 3, the PDU session management method includes the following steps.

At step 301, an SM policy modification request for a PDU session is received, in which the request triggers establishment of a first QoS flow in the PDU session, and the PDU session is established by a first terminal.

At step 302, in response to no data transmission tunnel having a same identifier as a flow identifier of the first QoS flow existing between a first UPF of a first satellite and a second UPF of a second satellite, a data transmission tunnel between the first UPF and the second UPF is established, in which the first satellite is a satellite serving the first terminal, the second satellite is a satellite serving a second terminal, and the second terminal is determined based on application layer information.

At step 303, the first UPF is instructed to transmit data of the first QoS flow through the data transmission tunnel.

At step 304, data of a second QoS flow of the PDU session is transmitted through a data transmission tunnel between a first AN of the first satellite and a terrestrial UPF.

In the embodiments of the disclosure, steps 301-304 may be implemented in any implementation of the embodiments of the disclosure respectively, which is not limited in the embodiments of the disclosure and will not be repeated.

At step 305, in response to determining that a handover occurs to the first terminal, a third UPF is selected for the PDU session, in which the third UPF is a UPF on a third satellite serving the first terminal after the handover.

In the embodiment of the disclosure, after the data transmission tunnel between the first satellite and the second satellite is established, the first terminal may also change the first AN to which it accesses according to an actual service requirement, i.e., the satellite and the AN accessed by the first terminal are changed, and thus the previously established data transmission tunnel is unable to continue to realize data transmission between the first terminal and the second terminal. Therefore, after the data transmission tunnel between the first satellite and the second satellite is established, the SMF can monitor whether the first AN accessed by the first terminal is changed in real time and update the data transmission tunnel in time.

The third satellite refers to the satellite accessed by the first terminal after the handover of the AN accessed by the first terminal. For example, if the first AN accessed by the first terminal before the handover is an AN configured in a satellite A, and the AN accessed by the first terminal after the handover is an AN configured in a satellite B, then the satellite B is the third satellite.

In the embodiment of the disclosure, in response to monitoring the handover of the first AN accessed by the first terminal, the third satellite accessed by the first terminal after the handover of the AN can be obtained. Tunnel information of the third UPF on the third satellite can be obtained to update the data transmission tunnel according to the third UPF.

At step 306, the third UPF is inserted in the PDU session, and a data transmission tunnel between the second UPF and the third UPF is established.

In the embodiment of the disclosure, when the handover occurs to the AN accessed by the first terminal, the third UPF of the third satellite accessed by the first terminal after the handover can be inserted into the PDU session, to establish the data transmission tunnel between the second UPF and the third UPF. In detail, opposite endpoint information contained in tunnel information of the third UPF can be updated based on tunnel endpoint information of the second UPF contained in tunnel information of the second UPF, and opposite endpoint information contained in the tunnel information of the second UPF is updated based on tunnel endpoint information of the third UPF contained in the tunnel information of the third UPF, so that the third UPF and the second UPF are informed of the opposite endpoint information of the opposite endpoint with which communication is performed, to achieve direct communication between the third UPF and the second UPF, thereby completing the establishment of the data transmission tunnel between the second UPF and the third UPF to realize the transmission of the first QoS flow of the PDU session between the first terminal and the second terminal.

According to the PDU session management method provided by the embodiment of the disclosure, the SMF receives the SM policy modification request for the PDU session established by the first terminal, establishes the data transmission tunnel between the first UPF and the second UPF when there is no data transmission tunnel having the same identifier as the flow identifier of the first QoS flow in the PDU session between the first UPF of the first satellite and the second UPF of the second satellite, instructs the first UPF to transmit the data of the QoS flow through the data transmission tunnel and transmit the second QoS flow to the second satellite through the data transmission tunnel between the first AN of the first satellite and the terrestrial UPF, and updates the data transmission tunnel when the handover of the AN accessed by the first terminal occurs. In this way, the data transmission tunnel between the first satellite and the second satellite is established by setting the UPF on the satellite, the data transmission tunnel is updated when the AN accessed by a satellite terminal is changed, and further the diversion process is performed on the QoS flow according to the actual service requirements, to realize transmission of specific service data between the first terminal and the second terminal through the data transmission tunnel, so that there is no need to send service data of the satellite terminal to the ground through a satellite route, thereby reducing a transmission delay of the specific service data and ensuring a stability of the data transmission tunnel, and further enhancing a reliability of direct data transmission on the satellite.

In a possible implementation of the disclosure, an association relation between an identifier of the satellite terminal and a corresponding UP context can also be pre-established in the SMF, to enhance the convenience of obtaining the tunnel information when establishing the data transmission tunnel between the first UPF and the second UPF.

The PDU session management method provided by the embodiment of the disclosure is further described below in combination with FIG. 4.

Figure 4:
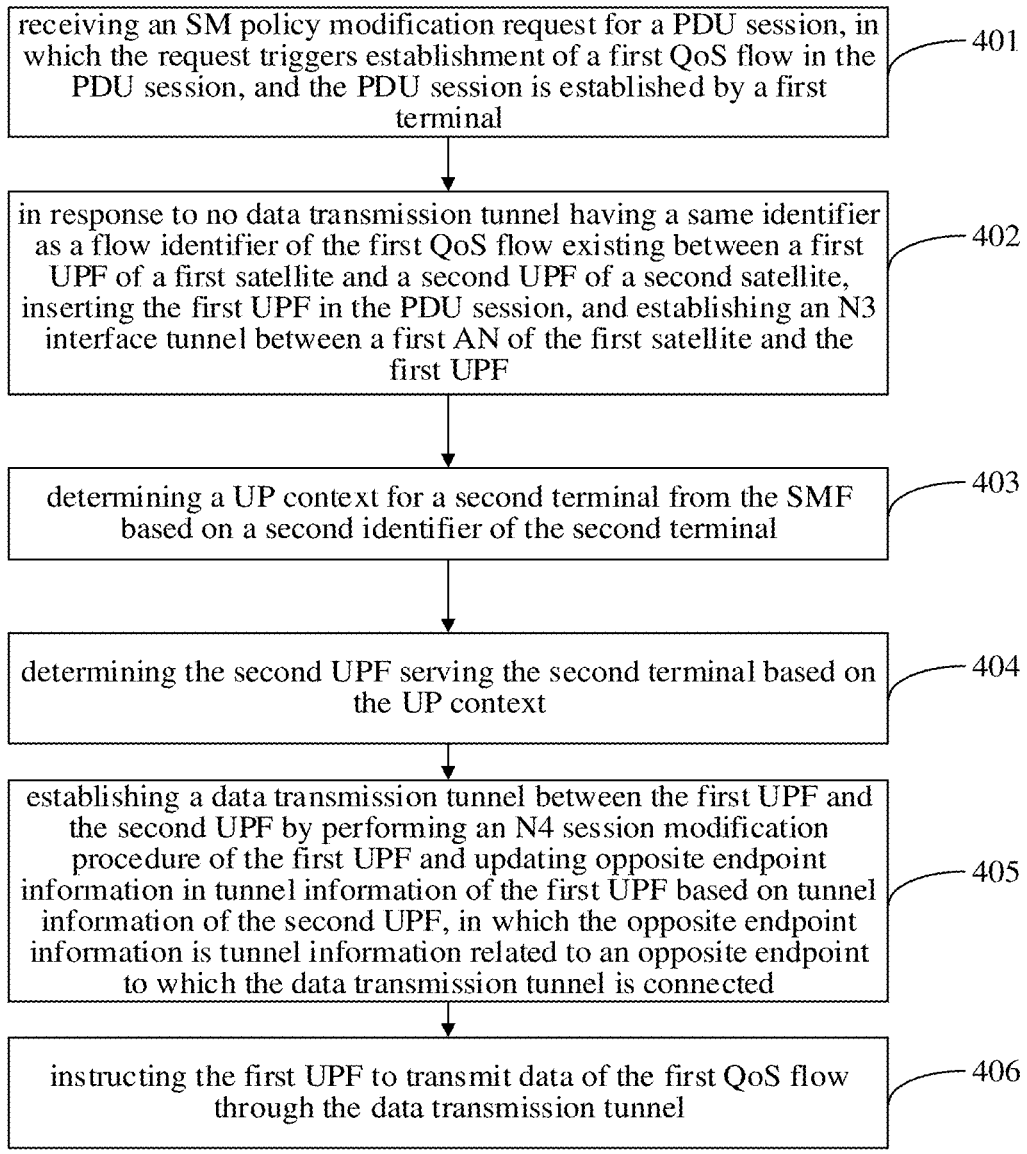
FIG. 4 is a flowchart of a PDU session management method according to a further embodiment of the disclosure.

FIG. 4 is a flowchart of a PDU session management method according to a further embodiment of the disclosure.

As shown in FIG. 4, the PDU session management method includes the following steps.

At step 401, an SM policy modification request for a PDU session is received, in which the request triggers establishment of a first QoS flow in the PDU session, and the PDU session is established by a first terminal.

In the embodiment of the disclosure, step 401 may be implemented in any implementation of the embodiments of the disclosure respectively, which is not limited in the embodiments of the disclosure and will not be repeated.

At step 402, in response to no data transmission tunnel having a same identifier as a flow identifier of the first QoS flow existing between a first UPF of a first satellite and a second UPF of a second satellite, the first UPF is inserted in the PDU session, and an N3 interface tunnel between a first AN of the first satellite and the first UPF is established.

In the embodiment of the disclosure, when it is determined that data of the first QoS flow needs to be transmitted between the first satellite serving the first terminal and the second satellite serving the second terminal, and there is no data transmission tunnel having the same identifier as the flow identifier of the first QoS flow between the first UPF and the second UPF, the SMF may insert the first UPF associated with the first satellite in the PDU session of the first terminal, to establish the N3 interface tunnel between the first AN of the first satellite and the first UPF.

At step 403, a UP context for a second terminal is determined from the SMF based on a second identifier of the second terminal.

At step 404, the second UPF serving the second terminal is determined based on the UP context.

In the embodiment of the disclosure, when the SMF establishes the data transmission tunnel between the first UPF and the second UPF, the UP context associated with the second identifier (e.g., SUPI/GPSI) of the second terminal can be determined as the UP context of the second terminal based on an association relation between the second identifier and the UP context stored in the SMF. Tunnel information corresponding to the UP context of the second terminal can be determined as tunnel information of the second UPF based on a mapping relation between the UP context and the tunnel information stored in the SMF, so that the second UPF serving the second terminal can be determined.

At step 405, a data transmission tunnel between the first UPF and the second UPF is established by performing an N4 session modification procedure of the first UPF and updating opposite endpoint information in tunnel information of the first UPF based on tunnel information of the second UPF, in which the opposite endpoint information is tunnel information related to an opposite endpoint to which the data transmission tunnel is connected.

In the embodiment of the disclosure, the SMF can initiate a Namf_Communication_NIN2MessageTransfer request to the Access and Mobility Management Function (AMF), and the N2 SM Information carried in the request contains the tunnel information of the first UPF and the information about the QoS flow. Afterwards, the AMF forwards the tunnel information of the first UPF and the information about the QoS flow to the satellite AN of the first satellite, and then a voice data bearer is established between the satellite AN of the first satellite and the first terminal. The satellite AN of the first satellite replies an N2 message to the AMF, which contains the AN tunnel information of the satellite AN of the first satellite. The AMF then forwards the AN tunnel information of the satellite AN of the first satellite to the SMF, and the SMF performs the N4 session modification procedure of the first UPF, to update the opposite endpoint information in the tunnel information of the first UPF based on the tunnel information of the second UPF, so that the first UPF is aware of the tunnel information of the second UPF, and the data transmission tunnel between the first UPF and the second UPF can be established.

At step 406, the first UPF is instructed to transmit data of the first QoS flow through the data transmission tunnel.

In the embodiment of the disclosure, step 406 may be implemented in any implementation of the embodiments of the disclosure respectively, which is not limited in the embodiments of the disclosure and will not be repeated.

According to the PDU session management method provided by the embodiment of the disclosure, the SMF receives the SM policy modification request for the PDU session established by the first terminal, establishes the data transmission tunnel between the first UPF and the second UPF when there is no data transmission tunnel having the same identifier as the flow identifier of the first QoS flow in the PDU session between the first UPF of the first satellite and the second UPF of the second satellite, and instructs the first UPF to transmit the data of the QoS flow through the data transmission tunnel. Therefore, by pre-establishing the association relation between the second identifier of a satellite terminal and the corresponding UP context in the SMF, and adding the tunnel information of the UPF associated with the satellite to the UP context, the data transmission tunnel between the first satellite and the second satellite is established by setting the UPF on the satellite, to achieve transmission of specific service data between the first terminal and the second terminal through the data transmission tunnel, so that there is no need to send service data of the satellite terminal to the ground through a satellite route, thereby reducing a transmission delay of the specific service data, and ensuring a reliability of other data transmission and convenience of obtaining the UPF tunnel information.

In a possible implementation of the disclosure, when transmitting the QoS flow by means of diversion, the flow identifier of the QoS flow carrying the specific service data can be associated with the data transmission tunnel between the first UPF and the second UPF, to transmit the QoS flow after the diversion through the data transmission tunnel between the first UPF and the second UPF.

The PDU session management method provided by the embodiment of the disclosure is further described below in combination with FIG. 5.

Figure 5:
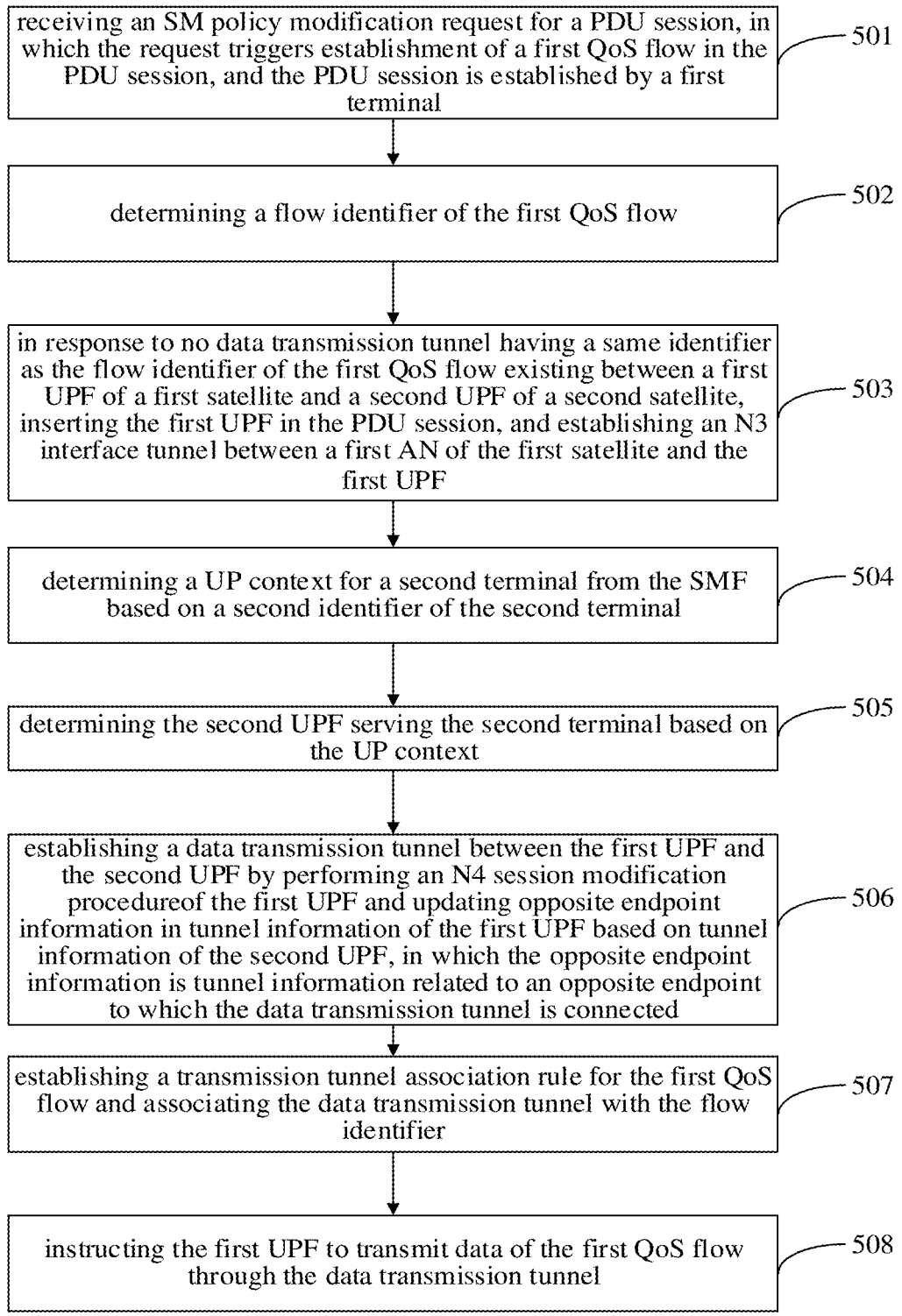
FIG. 5 is a flowchart of a PDU session management method according to a further embodiment of the disclosure.

FIG. 5 is a flowchart of a PDU session management method according to a further embodiment of the disclosure.

As shown in FIG. 5, the PDU session management method includes the following steps.

At step 501, an SM policy modification request for a PDU session is received, in which the request triggers establishment of a first QoS flow in the PDU session, and the PDU session is established by a first terminal.

In the embodiment of the disclosure, step 501 may be implemented in any implementation of the embodiments of the disclosure respectively, which is not limited in the embodiments of the disclosure and will not be repeated.

At step 502, a flow identifier of the first QoS flow is determined.

The flow identifier can be a 5QI parameter of the QoS flow.

In the embodiment of the disclosure, when the PCF initiates an SM policy modification procedure to the SMF, an IMS voice-related QoS policy can be sent to the SMF, to trigger the SMF to establish the first QoS flow with 5QI=1 on the first terminal side, i.e., to determine the flow identifier of the first QoS flow as 1.

At step 503, in response to no data transmission tunnel having a same identifier as the flow identifier of the first QoS flow existing between a first UPF of a first satellite and a second UPF of a second satellite, the first UPF is inserted in the PDU session, and an N3 interface tunnel between a first AN of the first satellite and the first UPF is established.

At step 504, a UP context for a second terminal is determined from the SMF based on a second identifier of the second terminal.

At step 505, the second UPF serving the second terminal is determined based on the UP context.

At step 506, a data transmission tunnel between the first UPF and the second UPF is established by performing an N4 session modification procedure of the first UPF and updating opposite endpoint information in tunnel information of the first UPF based on tunnel information of the second UPF, in which the opposite endpoint information is tunnel information related to an opposite endpoint to which the data transmission tunnel is connected.

In the embodiment of the disclosure, steps 503-506 may be implemented in any implementation of the embodiments of the disclosure respectively, which is not limited in the embodiments of the disclosure and will not be repeated.

At step 507, a transmission tunnel association rule for the first QoS flow is established and the data transmission tunnel is associated with the flow identifier.

In the embodiment of the disclosure, after determining the flow identifier of the first QoS flow in the PDU session, the transmission tunnel association rule can be established, i.e., the flow identifier of the first QoS flow is associated with the tunnel information of the first UPF or the tunnel information of the second UPF, to associate the QoS flow with the flow identifier of the first QoS flow (i.e., 5QI=1) with the data transmission tunnel between the first UPF and the second UPF.

In the embodiment of the disclosure, it is also possible to determine a flow identifier of the second QoS flow and establish an association relation between the flow identifier of the second QoS flow and a terrestrial transmission path in the transmission tunnel association rule. That is, the flow identifier of the second QoS flow is associated with the tunnel information of the terrestrial UPF, to associate the flow identifier of the second QoS flow (i.e., 5QI=5) with the terrestrial transmission path.

At step 508, the first UPF is instructed to transmit data of the first QoS flow through the data transmission tunnel.

In the embodiment of the disclosure, since the flow identifier of the first QoS flow has been associated with the data transmission tunnel between the first UPF and the second UPF, after the data transmission tunnel between the first UPF and the second UPF is established, when the first satellite and the second satellite obtain the QoS flow with the flow identifier of the first QoS flow (i.e., 5QI=1), the data transmission tunnel between the first UPF and the second UPF can be used to achieve the transmission of the first QoS flow between the first terminal and the second terminal.

Correspondingly, since the flow identifier of the second QoS flow has been associated with the terrestrial transmission path, when the first satellite and the second satellite obtain the QoS flow with the flow identifier of the second QoS flow (i.e., 5QI=5), the terrestrial transmission path can be directly used to achieve the transmission of the second QoS flow between the first terminal and the second terminal.

In the embodiment of the disclosure, step 505 may be implemented in any implementation of the embodiments of the disclosure respectively, which is not limited in the embodiments of the disclosure and will not be repeated.

According to the PDU session management method provided by the embodiment of the disclosure, the SMF receives the SM policy modification request for the PDU session established by the first terminal, establishes the data transmission tunnel between the first UPF of the first satellite and the second UPF of the second satellite when there is no data transmission tunnel having the same identifier as the flow identifier of the first QoS flow in the PDU session between the first UPF of the first satellite and the second UPF of the second satellite, establishes the transmission tunnel association rule for the first QoS flow to associate the data transmission tunnel with the flow identifier of the first QoS flow, and instructs the first UPF to transmit the data of the first QoS flow through the data transmission tunnel. As a result, the data transmission tunnel between the first satellite and the second satellite is established by setting UPF on the satellite, and the diversion process is performed on the QoS flow according to the actual service requirements, to realize transmission of specific service data between the first terminal and the second terminal through the data transmission tunnel, so that there is no need to send service data of a satellite terminal to the ground through a satellite route, thereby reducing a transmission delay of the specific service data and ensuring a reliability of other data transmission.

In a possible implementation of the disclosure, when transmitting the QoS flow by means of diversion, the diversion process on the QoS flow can be performed either in the AN configured in the satellite or in the UPF associated with the satellite, to enhance the flexibility and applicability of PDU session management.

The PDU session management method provided by the embodiment of the disclosure is further described below in combination with FIG. 6.

Figure 6:
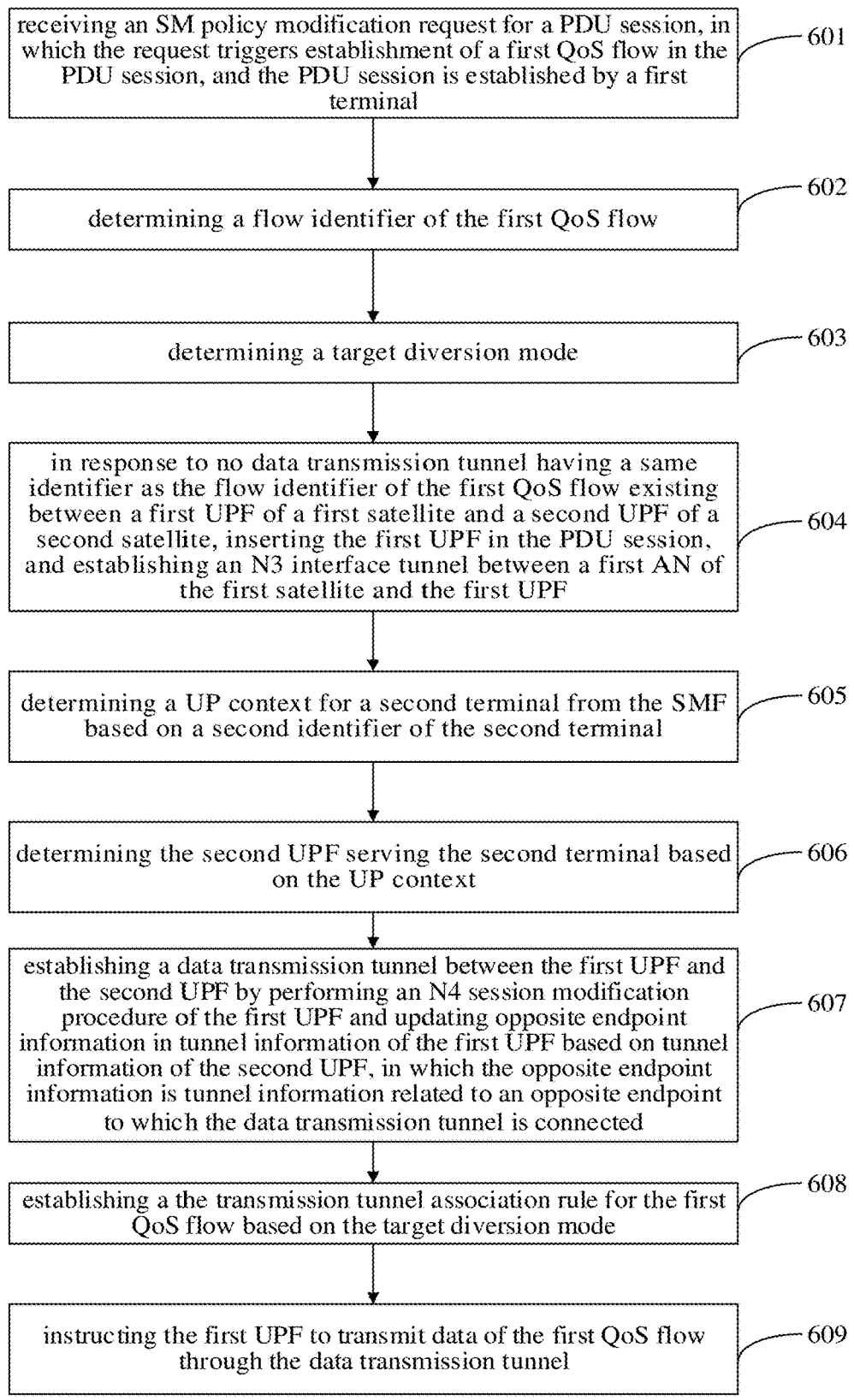
FIG. 6 is a flowchart of a PDU session management method according to a further embodiment of the disclosure.

FIG. 6 is a flowchart of a PDU session management method according to a further embodiment of the disclosure.

As shown in FIG. 6, the PDU session management method includes the following steps.

At step 601, an SM policy modification request for a PDU session is received, in which the request triggers establishment of a first QoS flow in the PDU session, and the PDU session is established by a first terminal.

At step 602, a flow identifier of the first QoS flow is determined.

In the embodiment of the disclosure, steps 601-602 may be implemented in any implementation of the embodiments of the disclosure respectively, which is not limited in the embodiments of the disclosure and will not be repeated.

At step 603, a target diversion mode is determined.

The target diversion mode includes satellite AN diversion or satellite UPF diversion.

It should be noted that the satellite AN diversion refers to using a first AN configured in a first satellite to perform the diversion process on the QoS flow, so that a first UPF associated with the first satellite can only obtain the first QoS flow that needs to be transmitted between the first UPF and the second UPF, and transmit it to a second UPF associated with a second satellite through a data transmission tunnel between the first UPF and the second UPF. Correspondingly, a second QoS flow is sent directly by the first AN configured in the first satellite to a UPF of another transmission tunnel and sent to a third AN configured in the second satellite via a terrestrial UPF, i.e., the second QoS flow does not have to be transmitted through the first UPF associated with the first satellite.

Satellite UPF diversion refers to sending the QoS flow to the first UPF associated with the first satellite by the first AN configured in the first satellite, using the first UPF associated with the first satellite to perform the diversion process on the QoS flow, transmitting the first QoS flow in the PDU session to the second UPF associated with the second satellite through the data transmission tunnel between the first UPF and the second UPF, and sending the second QoS flow to the second UPF associated with the second satellite through the terrestrial transmission tunnel.

In the embodiment of the disclosure, an operator can set the target diversion mode according to the actual service requirements. Therefore, the SMF can determine the current target diversion mode based on the operator's configuration.

At step 604, in response to no data transmission tunnel having a same identifier as the flow identifier of the first QoS flow existing between a first UPF of a first satellite and a second UPF of a second satellite, the first UPF is inserted in the PDU session, and an N3 interface tunnel between a first AN of the first satellite and the first UPF is established.

At step 605, a UP context for a second terminal is determined from the SMF based on a second identifier of the second terminal.

At step 606, the second UPF serving the second terminal is determined based on the UP context.

At step 607, a data transmission tunnel between the first UPF and the second UPF is established by performing an N4 session modification procedure of the first UPF and updating opposite endpoint information in tunnel information of the first UPF based on tunnel information of the second UPF, in which the opposite endpoint information is tunnel information related to an opposite endpoint to which the data transmission tunnel is connected.

In the embodiment of the disclosure, after determining the target diversion mode and establishing the data transmission tunnel between the first UPF and the second UPF, in response to the target diversion mode being the satellite UPF diversion, the SMF may send flow forwarding rule to the first UPF, such that uplink data received from the N3 interface tunnel is transmitted through the data transmission tunnel, and downlink data received from the data transmission tunnel is transmitted through the N3 interface tunnel; and in response to the target diversion mode being the satellite AN diversion, the SMF may send a flow forwarding rule to the first AN, such that uplink data received from the first AN is transmitted through the data transmission tunnel, and downlink data received from the data transmission tunnel is transmitted through the first AN.

In the embodiment of the disclosure, steps 604-607 may be implemented in any implementation of the embodiments of the disclosure respectively, which is not limited in the embodiments of the disclosure and will not be repeated.

At step 608, a transmission tunnel association rule for the first QoS flow is established based on the target diversion mode.

In the embodiment of the disclosure, after the SMF determines the target diversion mode, the data required to establish the transmission tunnel association rule may be sent to the first AN configured in the first satellite or the first UPF associated with the first satellite, to cause the first AN configured in the first satellite or the first UPF associated with the first satellite to establish the transmission tunnel association rule. In detail, in response to the target diversion mode being the satellite AN diversion, the data is sent to the first AN configured in the first satellite; and in response to the target diversion mode being the satellite UPF diversion, the data is sent to the first UPF associated with the first satellite.

In the embodiment of the disclosure, when establishing the transmission tunnel association rule, the first AN configured in the first satellite or the first UPF associated with the first satellite can associate the flow identifier of the first QoS flow with the tunnel information of the first UPF or the tunnel information of the second UPF, to associate the first QoS flow with the data transmission tunnel between the first UPF and the second UPF.

In the embodiment of the disclosure, it is also possible to determine a flow identifier of the second QoS flow and establish an association relation between the flow identifier of the second QoS flow and a terrestrial transmission path in the transmission tunnel association rule, i.e., the flow identifier of the second QoS flow is associated with the tunnel information of the terrestrial UPF.

At step 609, the first UPF is instructed to transmit data of the first QoS flow through the data transmission tunnel.

In the embodiment of the disclosure, since the flow identifier of the first QoS flow has been associated with the data transmission tunnel between the first UPF and the second UPF, after the data transmission tunnel between the first UPF and the second UPF is established, when the QoS flow with the flow identifier of the first QoS flow (i.e., 5QI=1) is obtained, the first satellite and the second satellite can use the data transmission tunnel between the first UPF and the second UPF to realize the transmission of the first QoS flow between the first terminal and the second terminal.

Correspondingly, since the flow identifier of the second QoS flow has been associated with the terrestrial transmission path, when the QoS flow with the flow identifier of the second QoS flow (i.e., 5QI=5) is obtained, the first satellite and the second satellite can directly use the terrestrial transmission path to achieve the transmission of the second QoS flow between the first terminal and the second terminal.

In the embodiment of the disclosure, step 609 may be implemented in any implementation of the embodiments of the disclosure respectively, which is not limited in the embodiments of the disclosure and will not be repeated.

According to the PDU session management method provided by the embodiment of the disclosure, the SMF receives the SM policy modification request for the PDU session established by the first terminal, establishes the data transmission tunnel between the first UPF of the first satellite and the second UPF of the second satellite when there is no data transmission tunnel having the same identifier as the flow identifier of the first QoS flow in the PDU session between the first UPF of the first satellite and the second UPF of the second satellite, establishes the transmission tunnel association rule for the QoS flow based on the target diversion mode to associate the data transmission tunnel with the flow identifier of the first QoS flow, and then instructs the first UPF to transmit the data of the first QoS flow through the data transmission tunnel. As a result, the data transmission tunnel between the first satellite and the second satellite is established by setting UPF on the satellite, and the diversion process is performed on the QoS flow according to the actual service requirements using the proper diversion mode, to realize transmission of specific service data between the first terminal and the second terminal through the data transmission tunnel, so that there is no need to send service data of a satellite terminal to the ground through a satellite route, thereby reducing a transmission delay of the specific service data, ensuring a reliability of other data transmission, and further improving a flexibility and applicability of PDU session management.

The processes of establishing the data transmission tunnel between the first UPF and the second UPF in response to performing satellite UPF diversion and satellite AN diversion are described respectively in detail in the embodiments shown in FIG. 7 and FIG. 8 below, respectively.

The PDU session management method provided by the embodiment of the disclosure is further described below in combination with FIG. 7.

Figure 7:
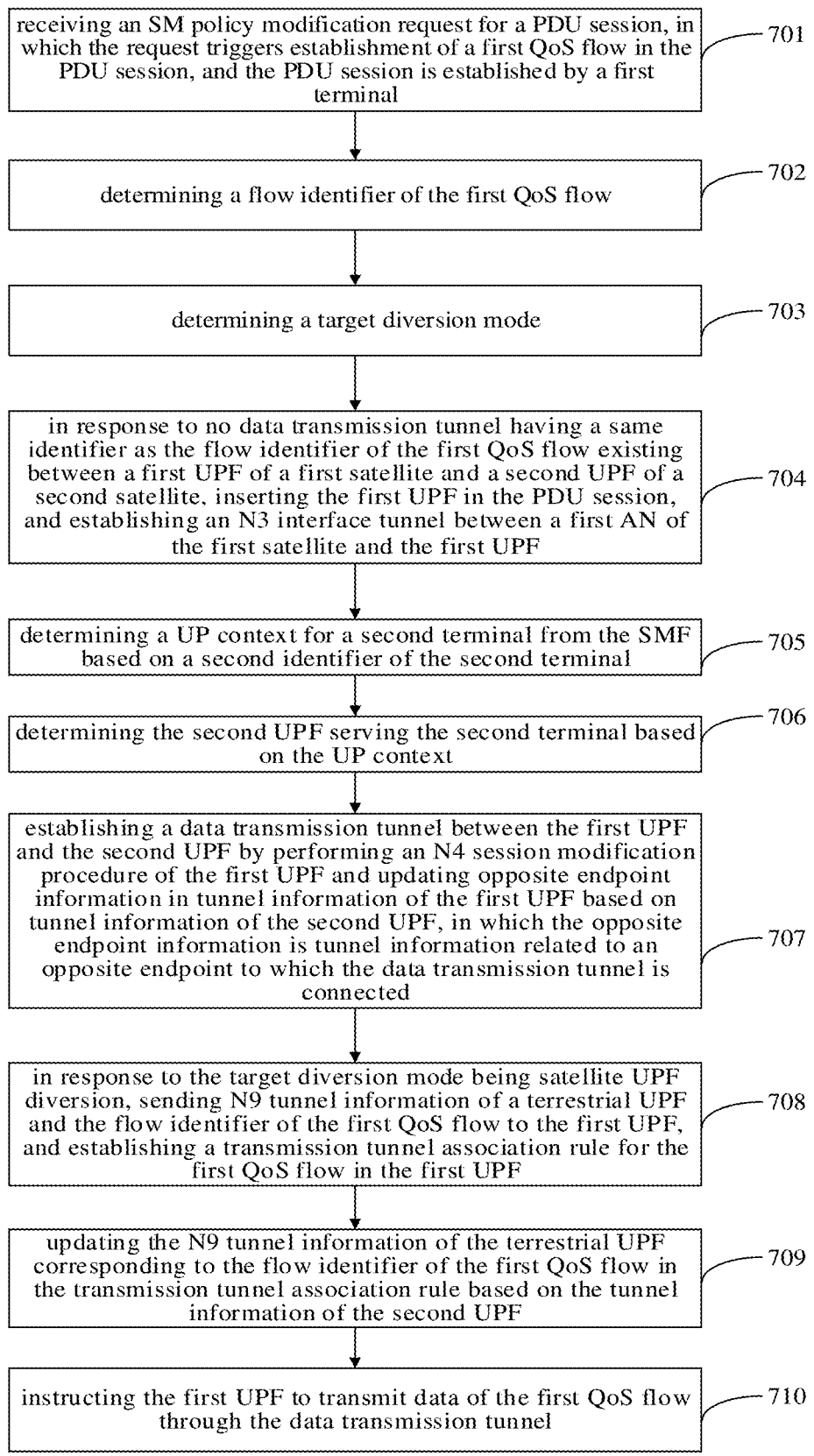
FIG. 7 is a flowchart of a PDU session management method according to a further embodiment of the disclosure.

FIG. 7 is a flowchart of a PDU session management method according to a further embodiment of the disclosure.

As shown in FIG. 7, the PDU session management method includes the following steps.

At step 701, an SM policy modification request for a PDU session is received, in which the request triggers establishment of a first QoS flow in the PDU session, and the PDU session is established by a first terminal.

At step 702, a flow identifier of the first QoS flow is determined.

At step 703, a target diversion mode is determined.

At step 704, in response to no data transmission tunnel having a same identifier as the flow identifier of the first QoS flow between a first UPF of a first satellite and a second UPF of a second satellite, the first UPF is inserted in the PDU session, and an N3 interface tunnel between a first AN of the first satellite and the first UPF is established.

At step 705, a UP context for a second terminal is determined from the SMF based on a second identifier of the second terminal.

At step 706, the second UPF serving the second terminal is determined based on the UP context.

At step 707, a data transmission tunnel between the first UPF and the second UPF is established by performing an N4 session modification procedure of the first UPF and updating opposite endpoint information in tunnel information of the first UPF based on tunnel information of the second UPF, in which the opposite endpoint information is tunnel information related to an opposite endpoint to which the data transmission tunnel is connected.

In the embodiment of the disclosure, steps 701-702 may be implemented in any implementation of the embodiments of the disclosure respectively, which is not limited in the embodiments of the disclosure and will not be repeated.

At step 708, in response to the target diversion mode being satellite UPF diversion, N9 tunnel information of a terrestrial UPF and the flow identifier of the first QoS flow are sent to the first UPF, and a transmission tunnel association rule for the first QoS flow is established in the first UPF.

In the embodiment of the disclosure, the SMF can initiate the N4 session establishment procedure to the first UPF, which contains a Packet Detection Rule (PDR) and Forwarding Action Rules (FAR) associated with the first QoS flow. That is, the N9 tunnel information of the terrestrial UPF and the flow identifier of the first QoS flow can be sent to the first UPF, to cause the first UPF to establish the transmission tunnel association rule for the first QoS flow.

Correspondingly, in the embodiment of the disclosure, the SMF can simultaneously send the N9 tunnel information of the terrestrial UPF, and the flow identifier of the second QoS flow to the first UPF during the N4 session establishment procedure, to cause the first UPF to establish a transmission tunnel association rule for the second QoS flow.

In the embodiment of the disclosure, after obtaining the N9 tunnel information of the terrestrial UPF and the flow identifier of the first QoS flow, the first UPF may associate the flow identifier of the first QoS flow with the N9 tunnel information of the terrestrial UPF, to establish the transmission tunnel association rule for the first QoS flow.

Correspondingly, after obtaining the N9 tunnel information of the terrestrial UPF and the flow identifier of the second QoS flow, the first UPF may associate the flow identifier of the second QoS flow with the N9 tunnel information of the terrestrial UPF, to establish the transmission tunnel association rule for the second QoS flow. In this case, both the first QoS flow and the second QoS flow are associated with the terrestrial transmission path.

At step 709, the N9 tunnel information of the terrestrial UPF corresponding to the flow identifier of the first QoS flow in the transmission tunnel association rule is updated based on the tunnel information of the second UPF.

In the embodiment of the disclosure, since the flow identifier of the first QoS flow is associated with the N9 tunnel information of the terrestrial UPF in the transmission tunnel association rule, i.e., the first QoS flow is transmitted through the terrestrial transport path, after the data transmission tunnel between the first UPF and the second UPF is established, the transmission tunnel association rule for the first QoS flow can be updated, i.e., the flow identifier of the first QoS flow is associated with the tunnel information of the second UPF, to transmit the first QoS flow through the data transmission tunnel between the first UPF and the second UPF.

At step 710, the first UPF is instructed to transmit data of the first QoS flow through the data transmission tunnel.

In the embodiment of the disclosure, since the updated transmission tunnel association rule includes an association relation between the flow identifier of the first QoS flow and the tunnel information of the second UPF, after the data transmission tunnel between the first UPF and the second UPF is established, when the QoS flow with the flow identifier of the first QoS flow (i.e., 5QI=1) is obtained, the first UPF can use the data transmission tunnel between the first UPF and the second UPF to realize the transmission of the first QoS flow between the first terminal and the second terminal.

Correspondingly, in the embodiment of the disclosure, since an association relation between the flow identifier of the second QoS flow and the N9 tunnel information of the terrestrial UPF is not updated in the updated transmission tunnel association rule, the updated transmission tunnel association rule includes the association relation between the flow identifier of the second QoS flow and the N9 tunnel information of the terrestrial UPF, so that when the QoS flow with the flow identifier of the second QoS flow (i.e., 5QI=5) is obtained, the first UPF can directly use the terrestrial transmission path to realize the transmission of the second QoS flow between the first terminal and the second terminal.

In the embodiment of the disclosure, step 710 may be implemented in any implementation of the embodiments of the disclosure respectively, which is not limited in the embodiments of the disclosure and will not be repeated.

According to the PDU session management method provided by the embodiment of the disclosure, the SMF receives the SM policy modification request for the PDU session established by the first terminal, establishes the data transmission tunnel between the first UPF of the first satellite and the second UPF of the second satellite when there is no data transmission tunnel having the same identifier as the flow identifier of the first QoS flow in the PDU session between the first UPF of the first satellite and the second UPF of the second satellite, establishes the transmission tunnel association rule for the first QoS flow in the first UPF in response to the target diversion mode being the satellite UPF diversion, and instructs the first UPF to transmit the data of the first QoS flow through the data transmission tunnel. As a result, the data transmission tunnel between the first satellite and the second satellite is established by setting UPF on the satellite, and the diversion process is performed on the QoS data flow according to the actual service requirements using the proper diversion mode, to realize transmission of specific service data between the first terminal and the second terminal through the data transmission tunnel, so that there is no need to send service data of a satellite terminal to the ground through a satellite route, thereby reducing a transmission delay of the specific service data, ensuring a reliability of other data transmission, and further improving a flexibility and applicability of PDU session management.

Figure 8:
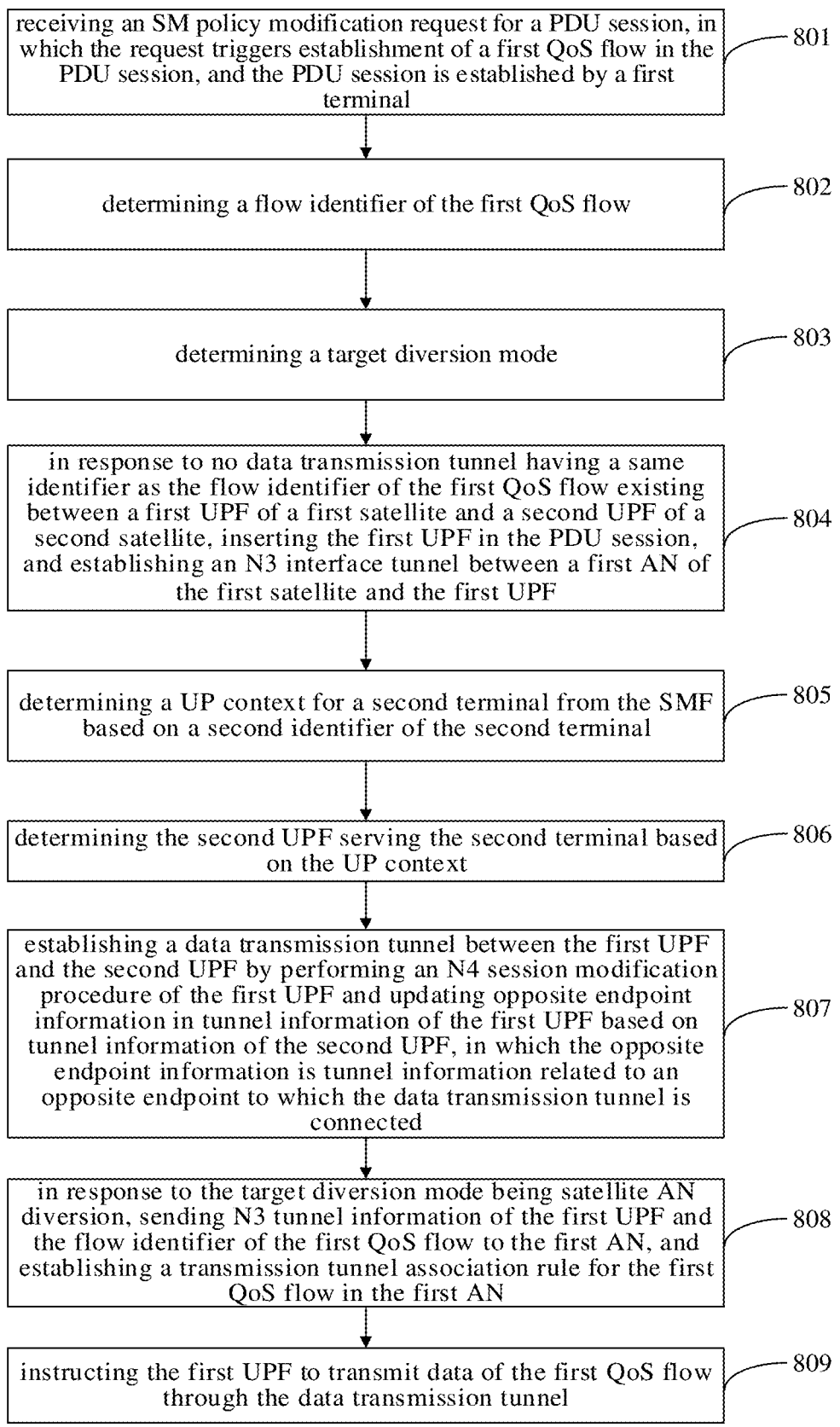
FIG. 8 is a flowchart of a PDU session management method according to a further embodiment of the disclosure.

In the embodiment shown in FIG. 8, the process of establishing the data transmission tunnel between the first UPF and the second UPF in response to performing the satellite AN diversion is described in detail.

The PDU session management method provided by the embodiment of the disclosure is further described below in combination with FIG. 8.

FIG. 8 is a flowchart of a PDU session management method according to a further embodiment of the disclosure.

As shown in FIG. 8, the PDU session management method includes the following steps.

At step 801, an SM policy modification request for a PDU session is received, in which the request triggers establishment of a first QoS flow in the PDU session, and the PDU session is established by a first terminal.

At step 802, a flow identifier of the first QoS flow is determined.

At step 803, a target diversion mode is determined.

At step 804, in response to no data transmission tunnel having a same identifier as the flow identifier of the first QoS flow existing between a first UPF of a first satellite and a second UPF of a second satellite, the first UPF is inserted in the PDU session, and an N3 interface tunnel between a first AN of the first satellite and the first UPF is established.

At step 805, a UP context for a second terminal is determined from the SMF based on a second identifier of the second terminal.

At step 806, the second UPF serving the second terminal is determined based on the UP context.

At step 807, a data transmission tunnel between the first UPF and the second UPF is established by performing an N4 session modification procedure of the first UPF and updating opposite endpoint information in tunnel information of the first UPF based on tunnel information of the second UPF, in which the opposite endpoint information is tunnel information related to an opposite endpoint to which the data transmission tunnel is connected.

In the embodiment of the disclosure, steps 801-807 may be implemented in any implementation of the embodiments of the disclosure respectively, which is not limited in the embodiments of the disclosure and will not be repeated.

At step 808, in response to the target diversion mode being satellite AN diversion, N3 tunnel information of the first UPF and the flow identifier of the first QoS flow are sent to the first AN, and a transmission tunnel association rule for the first QoS flow is established in the first AN.

In the embodiment of the disclosure, the SMF may initiate the N4 session establishment procedure to the first UPF, which contains the PDR and FAR associated with the first QoS flow, i.e., the flow identifier of the first QoS flow can be sent to the first UPF, to cause the first UPF to allocate the tunnel information of the first UPF.

The SMF may initiate a Namf_Communication_NIN2MessageTransfer request to the AMF, in which N2 SM Information carried in the request contains the tunnel information of the first UPF and the information about the first QoS flow. Afterwards, the AMF forwards the tunnel information of the first UPF and the information about the first QoS flow to the first AN of the first satellite, to cause the first AN of the first satellite to establish the transmission tunnel association rule for the first QoS flow, i.e., to associate the flow identifier of the first QoS flow with the tunnel information of the first UPF.

At step 809, the first UPF is instructed to transmit data of the first QoS flow through the data transmission tunnel.

In the embodiment of the disclosure, since an association relation between the flow identifier of the first QoS flow and the tunnel information of the first UPF has been included in the transmission tunnel association rule, after the data transmission tunnel between the first UPF and the second UPF is established, the first AN can use the data transmission tunnel between the first UPF and the second UPF to realize the transmission of the first QoS flow between the first terminal and the second terminal when the QoS flow with the flow identifier of the first QoS flow (i.e., 5QI=1) is obtained.

In the embodiment of the disclosure, step 809 may be implemented in any implementation of the embodiments of the disclosure respectively, which is not limited in the embodiments of the disclosure and will not be repeated.

According to the PDU session management method provided by the embodiment of the disclosure, the SMF receives the SM policy modification request for the PDU session established by the first terminal, establishes the data transmission tunnel between the first UPF of the first satellite and the second UPF of the second satellite when there is no data transmission tunnel having the same identifier as the flow identifier of the first QoS flow in the PDU session between the first UPF of the first satellite and the second UPF of the second satellite, establishes the transmission tunnel association rule for the first QoS flow in the first AN in response to the target diversion mode being the satellite AN diversion, so as to associate the data transmission tunnel with the flow identifier of the first QoS flow, and the first AN is instructed to transmit the data of the first QoS flow through the data transmission tunnel. As a result, the data transmission tunnel between the first satellite and the second satellite is established by setting UPF on the satellite, and the diversion process is performed on the QoS data flow according to the actual service requirements using the proper diversion mode, to realize transmission of specific service data between the first terminal and the second terminal through the data transmission tunnel, so that there is no need to send service data of a satellite terminal to the ground through a satellite route, thereby reducing a transmission delay of the specific service data, ensuring a reliability of other data transmission, and further improving a flexibility and applicability of PDU session management.

In a possible implementation of the disclosure, after the data transmission tunnel between the first satellite and the second satellite is established, the AN accessed by the first terminal may be handed over from the first AN to another AN, which requires the data transmission tunnel to be re-established after the handover of the AN, to improve the stability of the data transmission tunnel.

The PDU session management method provided by the embodiment of the disclosure is further described below in combination with FIG. 9.

Figure 9:
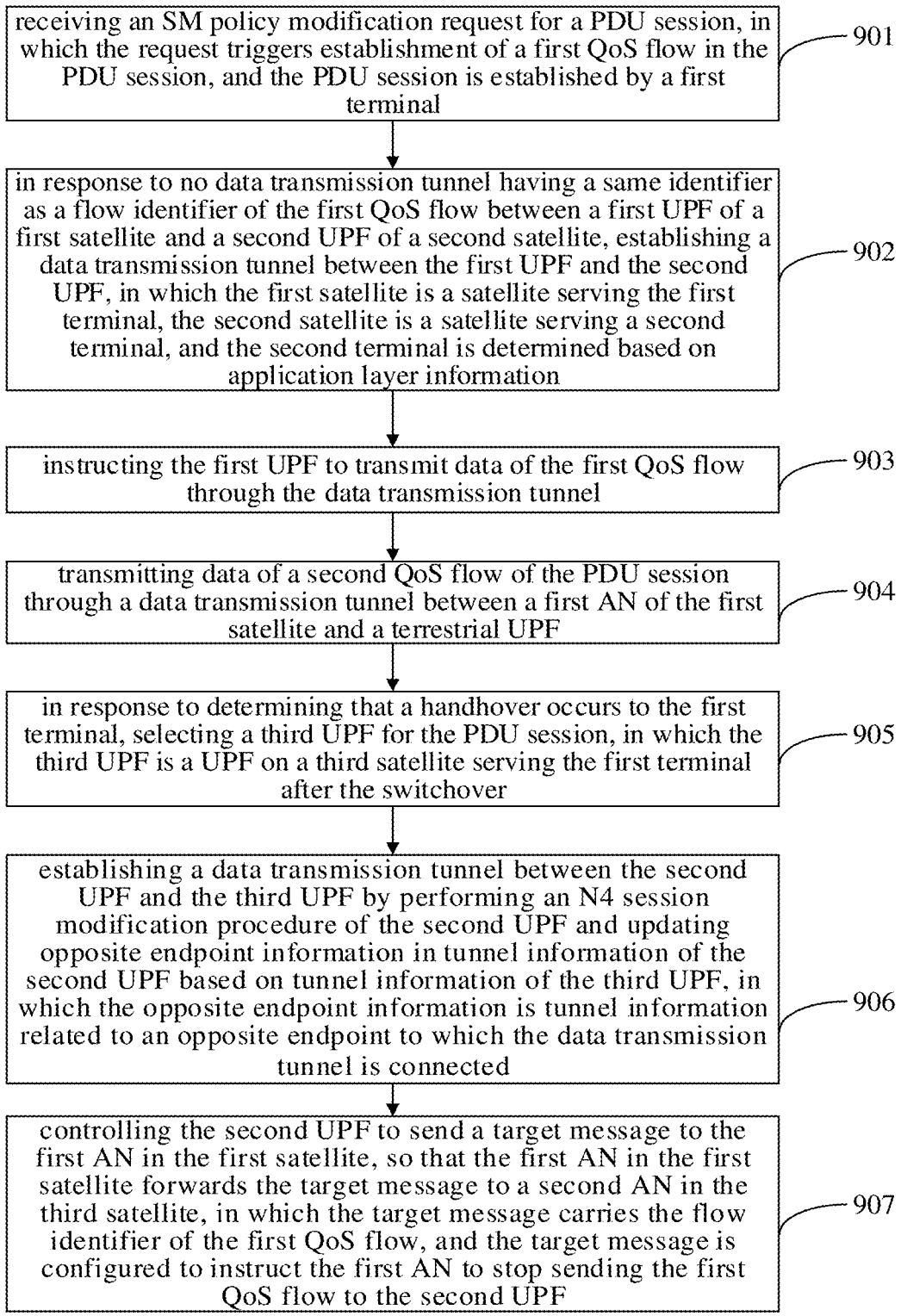
FIG. 9 is a flowchart of a PDU session management method according to a further embodiment of the disclosure.

FIG. 9 is a flowchart of a PDU session management method according to a further embodiment of the disclosure.

As shown in FIG. 9, the PDU session management method includes the following steps.

At step 901, an SM policy modification request for a PDU session is received, in which the request triggers establishment of a first QoS flow in the PDU session, and the PDU session is established by a first terminal.

At step 902, in response to no data transmission tunnel having a same identifier as a flow identifier of the first QoS flow existing between a first UPF of a first satellite and a second UPF of a second satellite, a data transmission tunnel between the first UPF and the second UPF is established, in which the first satellite is a satellite serving the first terminal, the second satellite is a satellite serving a second terminal, and the second terminal is determined based on application layer information.

At step 903, the first UPF is instructed to transmit data of the first QoS flow through the data transmission tunnel.

At step 904, data of a second QoS flow of the PDU session is transmitted through a data transmission tunnel between a first AN of the first satellite and a terrestrial UPF.

At step 905, in response to determining that a handover occurs to the first terminal, a third UPF is selected for the PDU session, in which the third UPF is a UPF on a third satellite serving the first terminal after the handover.

In the embodiment of the disclosure, steps 901-905 may be implemented in any implementation of the embodiments of the disclosure respectively, which is not limited in the embodiments of the disclosure and will not be repeated.

At step 906, a data transmission tunnel between the second UPF and the third UPF is established by performing an N4 session modification procedure of the second UPF and updating opposite endpoint information in tunnel information of the second UPF based on tunnel information of the third UPF, in which the opposite endpoint information is tunnel information related to an opposite endpoint to which the data transmission tunnel is connected.

In the embodiment of the disclosure, when the first AN accessed by the first terminal is changed, the opposite endpoint information in the tunnel information of the second UPF can be updated based on the tunnel information of the third UPF of the third satellite, to re-establish the data transmission tunnel between the first terminal and the second terminal.

In detail, when a handover of the AN occurs at the first terminal, the N4 session modification procedure may be initiated to the second UPF, to update the opposite endpoint information contained in the tunnel information of the second UPF based on the tunnel information of the third UPF, to establish the data transmission tunnel between the second UPF and the third UPF.

At step 907, the second UPF is controlled to send a target message to the first AN in the first satellite, so that the first AN in the first satellite forwards the target message to a second AN in the third satellite, in which the target message carries the flow identifier of the first QoS flow, and the target message is configured to instruct the first AN to stop sending the first QoS flow to the second UPF.

The target message may be an End Marker message sent by the second UPF to the first AN of the first satellite.

In the embodiment of the disclosure, after the data transmission tunnel between the second UPF and the third UPF is established, the second UPF can be controlled to send the target message carrying the flow identifier of the first QoS flow to the first AN in the first satellite, to notify the first AN to stop sending the first QoS flow. The first AN in the first satellite is controlled to forward the target message to the second AN in the third satellite to release the source path (i.e., the previously established data transmission tunnel between the first satellite and the second satellite).

It is understood that if the source path is released when the data transmission tunnel between the third satellite and the second satellite has not been reliably established yet, a packet loss is likely to occur. Therefore, in a possible implementation of the embodiment of the disclosure, a duration of the N4 session modification procedure of the second UPF can be determined in a timing manner after the N4 session modification procedure of the second UPF is performed, to determine whether the source path can be released based on the duration. As a possible implementation, a time threshold may be preset, and the second UPF is controlled to send the target message to the first AN in the first satellite to notify the first AN to stop sending the first QoS flow when the duration reaches the time threshold. The first AN in the first satellite is also controlled to forward the target message to the second AN in the third satellite to release the source path.

It is noted that when a handover occurs to the first AN accessed by the first terminal, the SMF may also initiate the N4 session modification procedure carrying the tunnel information of the third UPF to a terrestrial UPF to inform the terrestrial UPF that the handover occurs to the first AN, and the terrestrial UPF is triggered to send a second target message to the first AN in the first satellite to notify the first AN to stop sending the second QoS flow, in which the second target message carries the flow identifier of the second QoS flow. The first AN in the first satellite is controlled to forward the second target message to the second AN in the third satellite, to notify the second AN not to send the second QoS flow through the first AN subsequently.

The second target message may be an End Marker message sent by the terrestrial UPF to the first AN.

According to the PDU session management method provided by the embodiment of the disclosure, the SMF receives the SM policy modification request for the PDU session established by the first terminal, establishes the data transmission tunnel between the first UPF of the first satellite and the second UPF of the second satellite when there is no data transmission tunnel having the same identifier as the flow identifier of the first QoS flow in the PDU session between the first UPF of the first satellite and the second UPF of the second satellite, instructs the first UPF to transmit the data of the first QoS flow through the data transmission tunnel and transmit the second QoS flow to the second satellite through the data transmission tunnel between the first AN of the first satellite and the terrestrial UPF, and updates the data transmission tunnel when the AN accessed by the first terminal is changed. As a result, the data transmission tunnel between the first satellite and the second satellite is established by setting UPF on the satellite, the data transmission tunnel is updated when the AN accessed by the first terminal is changed, and the diversion process is performed on the QoS flow according to the actual service requirements, to realize transmission of specific service data between the first terminal and the second terminal through the data transmission tunnel, so that there is no need to send service data of a satellite terminal to the ground through a satellite route, thereby reducing a transmission delay of the specific service data, ensuring a reliability of other data transmission, and further improving a reliability of direct data transmission on the satellite.

In order to achieve the above embodiments, the disclosure also provides an apparatus.

Figure 10:
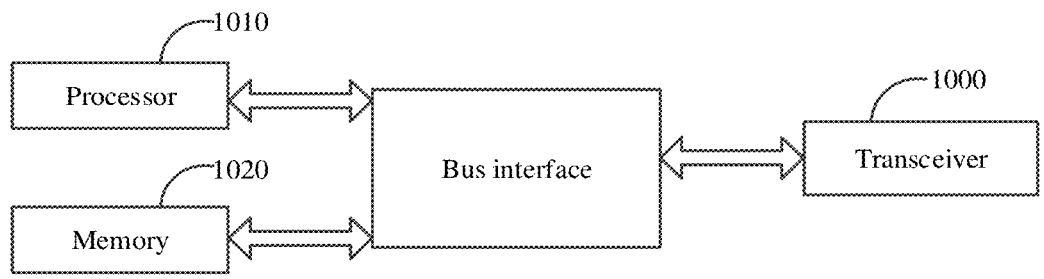
FIG. 10 is a block diagram of an apparatus according to an embodiment of the disclosure.

FIG. 10 is a block diagram of an apparatus according to an embodiment of the disclosure.

As shown in FIG. 10, the apparatus includes: a transceiver 1000, a processor 1010, and a memory 1020.

The memory 1020 is configured to store computer programs. The transceiver 1000 is configured to send and receive data under a control of the processor 1010. The processor 1010 is configured to read the computer programs in the memory 1020 and perform the following operations:

receiving an SM policy modification request for a PDU session, in which the request triggers establishment of a first QoS flow in the PDU session, and the PDU session is established by a first terminal;

in response to no data transmission tunnel having a same identifier as a flow identifier of the first QoS flow existing between a first UPF of a first satellite and a second UPF of a second satellite, establishing a data transmission tunnel between the first UPF and the second UPF, in which the first satellite is a satellite serving the first terminal, the second satellite is a satellite serving a second terminal, and the second terminal is determined based on application layer information; and instructing the first UPF to transmit data of the first QoS flow through the data transmission tunnel.

The transceiver 1000 is configured to receive and send data under the control of the processor 1010.

In FIG. 10, a bus architecture may include any number of interconnected buses and bridges. In detail, one or more processors represented by the processor 1010 are connected to various memory circuits represented by the memory 1020. The bus architecture may also connect various other circuits such as peripheral devices, voltage regulators, and power management circuits to each other, which are well known in the art and will not be further described herein. A bus interface provides interfaces. The transceiver 1000 may be a plurality of elements, i.e., including a transmitter and a receiver, which provides units for communicating with various other devices over transmission mediums. These transmission mediums include transmission mediums such as wireless channels, wired channels, and fiber optic cables. The processor 1010 is responsible for managing the bus architecture and the usual processing, and the memory 1020 may store data used by the processor 1010 in performing operations.

The processor 1010 can be a Central Processing Unit (CPU), an Application Specific Integrated Circuit (ASIC), a Field-Programmable Gate Array (FPGA), or a Complex Programmable Logic Device (CPLD). The processor can also adopt a multi-core architecture.

Further, in a possible implementation of the disclosure, the above processor 1010 is also configured to perform the following operations:

transmitting data of a second QoS flow of the PDU session through a data transmission tunnel between a first AN of the first satellite and a terrestrial UPF.

Further, in another possible implementation of the disclosure, after establishing the data transmission tunnel between the first UPF and the second UPF, the above processor 1010 is also configured to perform the following operations:

in response to determining that a handover occurs to the first terminal, selecting a third UPF for the PDU session, in which the third UPF is a UPF on a third satellite serving the first terminal after the handover; and inserting the third UPF in the PDU session, and establishing a data transmission tunnel between the second UPF and the third UPF.

Further, in another possible implementation of the disclosure, after receiving the SM policy modification request for the PDU session, the above processor 1010 is also configured to perform the following operations:

in response to a data transmission tunnel having the same identifier as the flow identifier of the first QoS flow existing between the first UPF and the second UPF, transmitting the data of the first QoS flow through the existing data transmission tunnel.

Further, in another possible implementation of the disclosure, before establishing the data transmission tunnel between the first UPF and the second UPF, the above processor 1010 is also configured to perform the following operations:

inserting the first UPF in the PDU session, and establishing an N3 interface tunnel between a first AN of the first satellite and the first UPF.

Further, in another possible implementation of the disclosure, establishing the data transmission tunnel between the first UPF and the second UPF includes:

determining a UP context for the second terminal from the SMF based on a second identifier of the second terminal;

determining the second UPF serving the second terminal based on the UP context; and establishing the data transmission tunnel between the first UPF and the second UPF by performing an N4 session modification procedure of the first UPF and updating opposite endpoint information in tunnel information of the first UPF based on tunnel information of the second UPF.

Further, in another possible implementation of the disclosure, before establishing the data transmission tunnel between the first UPF and the second UPF, the above processor 1010 is also configured to perform the following operations:

determining the flow identifier of the first QoS flow; and establishing a transmission tunnel association rule for the first QoS flow and associating the data transmission tunnel with the flow identifier.

Further, in another possible implementation of the disclosure, the processor 1010 is further configured to perform the following operations:

determining a target diversion mode; and establishing the transmission tunnel association rule for the first QoS flow based on the target diversion mode.

Further, in another possible implementation of the disclosure, the target diversion mode is satellite AN diversion or satellite UPF diversion.

Further, in another possible implementation of the disclosure, after establishing the data transmission tunnel between the first UPF and the second UPF, the above processor 1010 is also configured to perform the following operations:

in response to the target diversion mode being the satellite UPF diversion, sending a flow forwarding rule to the first UPF, such that uplink data received from the N3 interface tunnel is transmitted through the data transmission tunnel, and downlink data received from the data transmission tunnel is transmitted through the N3 interface tunnel; and in response to the target diversion mode being the satellite AN diversion, sending a flow forwarding rule to the first AN, such that uplink data received from the first AN is transmitted through the data transmission tunnel, and downlink data received from the data transmission tunnel is transmitted through the first AN.

Further, in another possible implementation of the disclosure, in response to the target diversion mode being the satellite AN diversion, establishing the transmission tunnel association rule for the first QoS flow based on the target diversion mode, includes:

sending N3 tunnel information of the first UPF and the flow identifier of the first QoS flow to the first AN, and establishing the transmission tunnel association rule for the first QoS flow in the first AN; and in response to the target diversion mode being the satellite UPF diversion, establishing the transmission tunnel association rule for the first QoS flow based on the target diversion mode, includes:

sending N9 tunnel information of the terrestrial UPF and the flow identifier of the first QoS flow to the first UPF, and establishing the transmission tunnel association rule for the first QoS flow in the first UPF.

Further, in another possible implementation of the disclosure, after establishing the transmission tunnel association rule for the first QoS flow in the first UPF, the above processor 1010 is also configured to perform the following operations:

updating the N9 tunnel information of the terrestrial UPF corresponding to the flow identifier of the first QoS flow in the transmission tunnel association rule based on the tunnel information of the second UPF.

Further, in another possible implementation of the disclosure, establishing the data transmission tunnel between the second UPF and the third UPF, includes:

establishing the data transmission tunnel between the second UPF and the third UPF by performing an N4 session modification procedure for the second UPF and updating opposite endpoint information in tunnel information of the second UPF based on tunnel information of the third UPF.

Further, in another possible implementation of the disclosure, the above processor 1010 is also configured to perform the following operation:

controlling the second UPF to send a target message to a first AN in the first satellite, so that the first AN in the first satellite forwards the target message to a second AN in the third satellite, in which the target message carries the flow identifier of the first QoS flow, and the target message is configured to instruct the first AN to stop sending the first QoS flow to the second UPF.

It should be noted here that the above apparatus provided by the embodiments of the disclosure can achieve all the method steps achieved by the above method embodiments and can achieve the same technical effects, and the same parts and beneficial effects of the embodiments of the disclosure as those of the method embodiments will not be specifically described herein.

To realize the above embodiments, the disclosure also provides a PDU session management apparatus.

Figure 11:
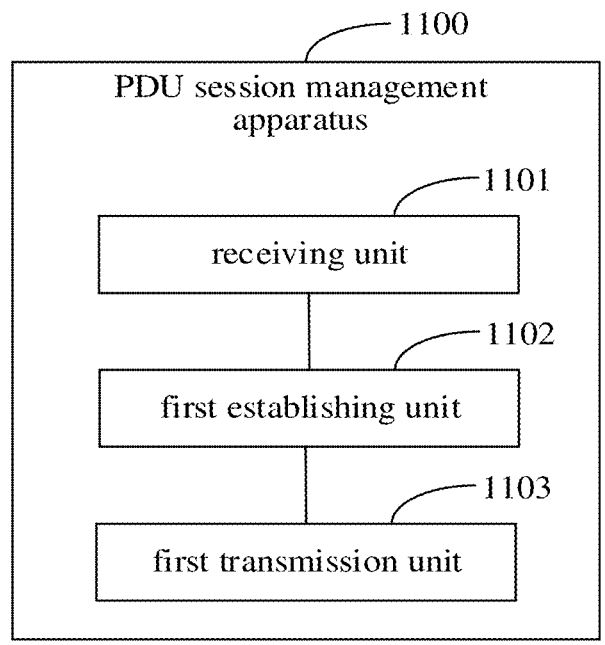
FIG. 11 is a block diagram of a PDU session management apparatus according to an embodiment of the disclosure.

FIG. 11 is a block diagram of a PDU session management apparatus according to an embodiment of the disclosure.

As shown in FIG. 11, the PDU session management apparatus 1100 includes: a receiving unit 1101, a first establishing unit 1102, and a first transmission unit 1103.

The receiving unit 1101 is configured to receive an SM policy modification request for a PDU session, in which the request triggers establishment of a first QoS flow in the PDU session, and the PDU session is established by a first terminal.

The first establishing unit 1102 is configured to, in response to no data transmission tunnel having a same identifier as a flow identifier of the first QoS flow existing between a first UPF of a first satellite and a second UPF of a second satellite, establish a data transmission tunnel between the first UPF and the second UPF, in which the first satellite is a satellite serving the first terminal, the second satellite is a satellite serving a second terminal, and the second terminal is determined based on application layer information.

The first transmission unit 1103 is configured to instruct the first UPF to transmit data of the first QoS flow through the data transmission tunnel.

Further, in a possible implementation of the disclosure, the PDU session management apparatus 1100 further includes: a second transmission unit.

The second transmission unit is configured to: transmit data of a second QoS flow of the PDU session through a data transmission tunnel between a first AN of the first satellite and a terrestrial UPF.

Further, in a possible implementation of the disclosure, the PDU session management apparatus 1100 further includes: a selection unit and a second establishing unit.

The selection unit is configured to: in response to determining that a handover occurs to the first terminal, select a third UPF for the PDU session, in which the third UPF is a UPF on a third satellite serving the first terminal after the handover.

The second establishing unit is configured to: insert the third UPF in the PDU session, and establish a data transmission tunnel between the second UPF and the third UPF.

Further, in a possible implementation of the disclosure, the PDU session management apparatus 1100 further includes: a third transmission unit.

The third transmission unit is configured to: in response to a data transmission tunnel having the same identifier as the flow identifier of the first QoS flow existing between the first UPF and the second UPF, transmit the data of the first QoS flow through the existing data transmission tunnel.

Further, in a possible implementation of the disclosure, the PDU session management apparatus 1100 further includes: a first inserting unit.

The first inserting unit is configured to: insert the first UPF in the PDU session, and establish an N3 interface tunnel between a first AN of the first satellite and the first UPF.

Further, in a possible implementation of the disclosure, the first establishing unit 1103 includes: a first determining subunit, a second determining subunit, and a first executing subunit.

The first determining subunit is configured to determine a UP context for the second terminal from the SMF based on a second identifier of the second terminal.

The second determining subunit is configured to determine the second UPF serving the second terminal based on the UP context.

The first executing subunit is configured to establish the data transmission tunnel between the first UPF and the second UPF by performing an N4 session modification procedure of the first UPF and updating opposite endpoint information in tunnel information of the first UPF based on tunnel information of the second UPF, in which the opposite endpoint information is tunnel information related to an opposite endpoint to which the data transmission tunnel is connected.

Further, in a possible implementation of the disclosure, the PDU session management apparatus 1100 further includes: a second determining unit and a first establishing unit.

The second determining unit is configured to determine the flow identifier of the first QoS flow.

The first establishing unit is configured to establish a transmission tunnel association rule for the first QoS flow and associate the data transmission tunnel with the flow identifier.

Further, in a possible implementation of the disclosure, the PDU session management apparatus 1100 further includes: a third determining unit and a second establishing unit.

The third determining unit is configured to determine a target diversion mode.

The second establishing unit is configured to establish the transmission tunnel association rule for the first QoS flow based on the target diversion mode.

Further, in a possible implementation of the disclosure, the target diversion mode is satellite AN diversion or satellite UPF diversion.

Further, in a possible implementation of the disclosure, the PDU session management apparatus 1100 further includes: a first issuing unit and a second issuing unit.

The first issuing unit is configured to: in response to the target diversion mode being the satellite UPF diversion, send a flow forwarding rule to the first UPF, such that uplink data received from the N3 interface tunnel is transmitted through the data transmission tunnel, and downlink data received from the data transmission tunnel is transmitted through the N3 interface tunnel.

The second issuing unit is configured to: in response to the target diversion mode being the satellite AN diversion, send a flow forwarding rule to the first AN, such that uplink data received from the first AN is transmitted through the data transmission tunnel, and downlink data received from the data transmission tunnel is transmitted through the first AN.

Further, in a possible implementation of the disclosure, in response to the target diversion mode being the satellite AN diversion, the second establishing unit includes: a first sending subunit.

The first sending subunit is configured to: send N3 tunnel information of the first UPF and the flow identifier of the first QoS flow to the first AN, and establish the transmission tunnel association rule for the first QoS flow in the first AN.

In response to the target diversion mode being the satellite UPF diversion, the second establishing unit includes: a second sending subunit.

The second sending subunit is configured to: send N9 tunnel information of the terrestrial UPF and the flow identifier of the first QoS flow to the first UPF, and establish the transmission tunnel association rule for the first QoS flow in the first UPF.

Further, in a possible implementation of the disclosure, the second establishing unit further includes: an updating subunit.

The updating subunit is configured to update the N9 tunnel information of the terrestrial UPF corresponding to the flow identifier of the first QoS flow in the transmission tunnel association rule based on the tunnel information of the second UPF.

Further, in a possible implementation of the disclosure, the second establishing unit further includes: a second executing subunit.

The second executing subunit is configured to: establish the data transmission tunnel between the second UPF and the third UPF by performing an N4 session modification procedure for the second UPF and updating opposite endpoint information in tunnel information of the second UPF based on tunnel information of the third UPF, in which the opposite endpoint information is tunnel information related to an opposite endpoint to which the data transmission tunnel is connected.

Further, in a possible implementation of the disclosure, the PDU session management apparatus 1100 further includes: a control unit.

The control unit is configured to: control the second UPF to send a target message to a first AN in the first satellite, so that the first AN in the first satellite forwards the target message to a second AN in the third satellite, in which the target message carries the flow identifier of the first QoS flow, and the target message is configured to instruct the first AN to stop sending the first QoS flow to the second UPF.

It should be noted that the division of units in the embodiments of the disclosure is schematic and is only based on logical functions, and in practice, other division modes can be adopted. In addition, each functional unit in each embodiment of the disclosure can be integrated in a single processing unit, or each unit can physically exist separately, or two or more units can be integrated in a single unit. The above integrated units can be implemented either in the form of hardware or in the form of software functional units.

When the integrated units are implemented as software functional units and sold or used as independent products, the units may be stored in a processor-readable storage medium. Based on this understanding, the technical solution of the disclosure, the part that essentially contributes to the related art, or all or part of the technical solution, may be embodied in the form of software product. The computer software product is stored in a storage medium and includes a number of instructions to cause a computer device (which may be a personal computer, a server, or a network device) or a processor to perform all or some of the steps of the method described in the embodiments of the disclosure. The aforementioned storage medium includes: a USB flash drive, a mobile hard drive, a Read-Only Memory (ROM), a Random Access Memory (RAM), a disk or a CD-ROM, and other mediums that can store program codes.

It is noted herein that the above apparatus provided by the embodiments of the disclosure is capable of implementing all the method steps achieved by the above method embodiments and achieving the same technical effects, and the same parts and beneficial effects of the embodiments of the disclosure as those of the method embodiments will not be specifically described herein.

In order to achieve the above embodiments, the disclosure also provides a processor-readable storage medium.

The processor-readable storage medium stores computer programs that are used to cause the processor to implement the PDU session management method described in the embodiments of the disclosure.

The processor-readable storage medium may be any available medium or data storage device to which the processor has access, which includes, but is not limited to, magnetic memories (e.g., floppy disks, hard disks, magnetic tapes, magnetic discs, etc.), optical memories, semiconductor memories, and solid state disks.

To implement the above embodiments, the disclosure also provides a computer program product that implements the PDU session management method when the instructions in the computer program product are executed by the processor.

Those skilled in the art should understand that the embodiments of the disclosure may be provided as methods, systems, or computer program products. Therefore, the disclosure may take the form of an entirely hardware embodiment, an entirely software embodiment, or an embodiment combining software and hardware aspects. In addition, the disclosure may take the form of a computer program product implemented on one or more computer-usable storage mediums (including, but not limited to, disk memories and optical memories) that contain computer-usable program codes therein.

The disclosure is described with reference to flowcharts and/or block diagrams of methods, devices (systems), and computer program products according to the embodiments of the disclosure. It is understood that each process and/or box in the flowchart and/or block diagram, and the combination of processes and/or boxes in the flowchart and/or block diagram, may be implemented by the computer-executable instructions. These computer executable instructions may be provided to the processors of a general purpose computer, a dedicated computer, an embedded processor, or other programmable data processing device to produce a machine, such that the instructions executed by the processor of the computer or other programmable data processing device produce a device for implementing the functions specified in one or more processes of the flowchart and/or one or more boxes of the block diagram.

These processor-executable instructions may also be stored in a processor-readable memory capable of directing a computer or other programmable data processing devices to operate in a particular manner, such that the instructions stored in such processor-readable memory produce an article of manufacture including an instruction device, which is used to implement the function specified in one or more processes of a flowchart and/or one or more boxes of a block diagram.

These processor-executable instructions may also be loaded onto a computer or other programmable data processing device, such that a series of operational steps are performed on the computer or other programmable device to produce computer-implemented processing, such that the instructions executed on the computer or other programmable device provide steps for implementing the functions specified in one or more processes of the flowchart and/or one or more boxes of the block diagram.

Obviously, those skilled in the art can make various changes and variations to the disclosure without departing from the spirit and scope of the disclosure. Therefore, if such modifications and variations made to the disclosure are within the scope of the claims of the disclosure and their technical equivalents, the disclosure is intended to include such modifications and variations as well.

What is claimed is:

1. A Protocol Data Unit (PDU) session management method, performed by a Session Management Function (SMF), comprising:
   receiving a Session Management (SM) policy modification request for a PDU session, wherein the SM policy modification request triggers establishment of a first Quality of Service (QoS) flow in the PDU session, and the PDU session is established by a first terminal;
   in response to no data transmission tunnel having a same identifier as a flow identifier of the first QoS flow existing between a first User Plane Function (UPF) of a first satellite and a second UPF of a second satellite, establishing a first data transmission tunnel between the first UPF and the second UPF, wherein the first satellite is a satellite serving the first terminal, the second satellite is a satellite serving a second terminal, and the second terminal is determined based on application layer information; and
   instructing the first UPF to transmit data of the first QoS flow through the first data transmission tunnel.

2. The method of claim 1, further comprising:
   transmitting data of a second QoS flow of the PDU session through a second data transmission tunnel between a first Access Network (AN) of the first satellite and a terrestrial UPF.

3. The method of claim 1, wherein after establishing the first data transmission tunnel between the first UPF and the second UPF, the method further comprises:
   in response to determining that a handover occurs to the first terminal, selecting a third UPF for the PDU session, wherein the third UPF is a UPF on a third satellite serving the first terminal after the handover; and
   inserting the third UPF in the PDU session, and establishing a third data transmission tunnel between the second UPF and the third UPF.

4. The method of claim 1, wherein after receiving the SM policy modification request for the PDU session, the method further comprises:
   in response to the first data transmission tunnel having the same identifier as the flow identifier of the first QoS flow existing between the first UPF and the second UPF, transmitting the data of the first QoS flow through the first data transmission tunnel;
   wherein the first data transmission tunnel for transmission is established after receiving a PDU session establishment request and determining that a second identifier of the second terminal corresponding to a first identifier of the first terminal exists, and the second terminal is a terminal to which the second identifier belongs.

5. The method of claim 4, wherein before receiving the SM policy modification request for the PDU session, the method further comprises:
   receiving the PDU session establishment request,
   wherein establishing the first data transmission tunnel between the first UPF and the second UPF, comprises:
   in response to existence of the second identifier of the second terminal corresponding to the first identifier of the first terminal, establishing the first data transmission tunnel between the first UPF and the second UPF.

6. The method of claim 1, wherein before establishing the first data transmission tunnel between the first UPF and the second UPF, the method further comprises:
   inserting the first UPF in the PDU session, and establishing an N3 interface tunnel between a first AN of the first satellite and the first UPF.

7. The method of claim 6, wherein establishing the first data transmission tunnel between the first UPF and the second UPF, comprises:
   determining a User Plane (UP) context for the second terminal from the SMF based on a second identifier of the second terminal;
   determining the second UPF serving the second terminal based on the UP context; and
   establishing the first data transmission tunnel between the first UPF and the second UPF by performing an N4 session modification procedure of the first UPF and updating opposite endpoint information in tunnel information of the first UPF based on tunnel information of the second UPF, wherein the opposite endpoint information is tunnel information related to an opposite endpoint to which the first data transmission tunnel is connected.

8. The method of claim 7, wherein before establishing the first data transmission tunnel between the first UPF and the second UPF, the method further comprises:
   determining the flow identifier of the first QoS flow; and
   establishing a transmission tunnel association rule for the first QoS flow and associating the first data transmission tunnel with the flow identifier.

9. The method of claim 8, further comprising:
   determining a target diversion mode; and
   establishing the transmission tunnel association rule for the first QoS flow based on the target diversion mode.

10. The method of claim 9, wherein the target diversion mode is satellite AN diversion or satellite UPF diversion.

11. The method of claim 10, wherein after establishing the first data transmission tunnel between the first UPF and the second UPF, the method further comprises:

in response to the target diversion mode being the satellite UPF diversion, sending a flow forwarding rule to the first UPF, such that uplink data received from the N3 interface tunnel is transmitted through the first data transmission tunnel, and downlink data received from the first data transmission tunnel is transmitted through the N3 interface tunnel; and in response to the target diversion mode being the satellite AN diversion, sending a flow forwarding rule to the first AN, such that uplink data received from the first AN is transmitted through the first data transmission tunnel, and downlink data received from the first data transmission tunnel is transmitted through the first AN.

12. The method of claim 10, wherein, in response to the target diversion mode being the satellite AN diversion, establishing the transmission tunnel association rule for the first QoS flow based on the target diversion mode, comprises: sending N3 tunnel information of the first UPF and the flow identifier of the first QoS flow to the first AN, and establishing the transmission tunnel association rule for the first QoS flow in the first AN;

in response to the target diversion mode being the satellite UPF diversion, establishing the transmission tunnel association rule for the first QoS flow based on the target diversion mode, comprises: sending N9 tunnel information of the terrestrial UPF and the flow identifier of the first QoS flow to the first UPF, and establishing the transmission tunnel association rule for the first QoS flow in the first UPF.

13. The method of claim 12, wherein after establishing the transmission tunnel association rule for the first QoS flow in the first UPF, the method further comprises:

updating the N9 tunnel information of the terrestrial UPF corresponding to the flow identifier of the first QoS flow in the transmission tunnel association rule based on the tunnel information of the second UPF.

14. The method of claim 3, wherein establishing the third data transmission tunnel between the second UPF and the third UPF, comprises:

establishing the third data transmission tunnel between the second UPF and the third UPF by performing an N4 session modification procedure for the second UPF and updating opposite endpoint information in tunnel information of the second UPF based on tunnel information of the third UPF, wherein the opposite endpoint information is tunnel information related to an opposite endpoint to which the third data transmission tunnel is connected.

15. The method of claim 3, further comprising:

controlling the second UPF to send a target message to a first AN in the first satellite, wherein the target message carries the flow identifier of the first QoS flow, and the flow identifier is used for forwarding of the target message to a second AN in the third satellite, and the target message is configured to instruct the first AN to stop sending the first QoS flow to the second UPF.

16. An apparatus, comprising: a memory, a transceiver, and a processor, wherein the memory is configured to store computer programs, the transceiver is configured to send and receive data under a control of the processor, and the processor is configured to read the computer programs in the memory and perform the following operations:

receiving a Session Management (SM) policy modification request for a Protocol Data Unit (PDU) session, wherein the SM policy modification request triggers establishment of a first Quality of Service (QoS) flow in the PDU session, and the PDU session is established by a first terminal;

in response to no data transmission tunnel having a same identifier as a flow identifier of the first QoS flow existing between a first User Plane Function (UPF) of a first satellite and a second UPF of a second satellite, establishing a first data transmission tunnel between the first UPF and the second UPF, wherein the first satellite is a satellite serving the first terminal, the second satellite is a satellite serving a second terminal, and the second terminal is determined based on application layer information; and instructing the first UPF to transmit data of the first QoS flow through the first data transmission tunnel.

17. The apparatus of claim 16, the processor is further configured to perform:

transmitting data of a second QoS flow of the PDU session through a second data transmission tunnel between a first Access Network (AN) of the rust satellite and a terrestrial UPF.

18. The apparatus of claim 16, wherein after establishing the first data transmission tunnel between the first UPF and the second UPF, the processor is further configured to perform:

in response to determining that a handover occurs to the first terminal, selecting a third UPF for the PDU session, wherein the third UPF is a UPF on a third satellite serving the first terminal after the handover; and inserting the third UPF in the PDU session, and establishing a third data transmission tunnel between the second UPF and the third UPF.

19. The apparatus of claim 16, wherein after receiving the SM policy modification request for the PDU session, the processor is further configured to perform:

in response to the first data transmission tunnel having the same identifier as the flow identifier of the first QoS flow existing between the first UPF and the second UPF, transmitting the data of the first QoS flow through the first data transmission tunnel;

wherein the first data transmission tunnel for transmission is established after receiving a PDU session establishment request and determining that a second identifier of the second terminal corresponding to a first identifier of the first terminal exists, and the second terminal is a terminal to which the second identifier belongs.

20. A processor-readable storage medium having computer programs stored thereon, wherein computer programs are configured to cause a processor to implement the Protocol Data Unit (PDU) session management method comprising:

receiving a Session Management (SM) policy modification request for a PDU session, wherein the SM policy modification request triggers establishment of a first Quality of Service (QoS) flow in the PDU session, and the PDU session is established by a first terminal;

in response to no data transmission tunnel having a same identifier as a flow identifier of the first QoS flow existing between a first User Plane Function (UPF) of a first satellite and a second UPF of a second satellite, establishing a first data transmission tunnel between the first UPF and the second UPF, wherein the first satellite is a satellite serving the first terminal, the second satellite is a satellite serving a second terminal, and the second terminal is determined based on application layer information; and instructing the first UPF to transmit data of the first QoS flow through the first data transmission tunnel.

* * * * *